United States Patent
Choyi et al.

(10) Patent No.: US 10,880,294 B2
(45) Date of Patent: Dec. 29, 2020

(54) END-TO-END AUTHENTICATION AT THE SERVICE LAYER USING PUBLIC KEYING MECHANISMS

(71) Applicant: Convida Wireless, LLC, Wilmington, DE (US)

(72) Inventors: Vinod Kumar Choyi, Norristown, PA (US); Dale N. Seed, Allentown, PA (US); Yogendra C. Shah, Exton, PA (US); Quang Ly, North Wales, PA (US); William Robert Flynn, IV, Schwenksville, PA (US); Michael F. Starsinic, Newtown, PA (US); Shamim Akbar Rahman, Cote St. Luc (CA); Zhuo Chen, Claymont, DE (US); Qing Li, Princeton Junction, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 50 days.

(21) Appl. No.: 16/138,312

(22) Filed: Sep. 21, 2018

(65) Prior Publication Data

US 2019/0036910 A1    Jan. 31, 2019

Related U.S. Application Data

(63) Continuation of application No. 15/071,659, filed on Mar. 16, 2016, now Pat. No. 10,110,595.
(Continued)

(51) Int. Cl.
*H04L 29/06* (2006.01)
*H04W 12/06* (2009.01)
(Continued)

(52) U.S. Cl.
CPC .......... *H04L 63/0823* (2013.01); *G06F 21/64* (2013.01); *H04L 9/3247* (2013.01);
(Continued)

(58) Field of Classification Search
CPC ... H04L 63/0823; H04L 9/3247; H04L 63/06; H04L 67/12; H04L 63/062; H04L 9/083;
(Continued)

(56) References Cited

U.S. PATENT DOCUMENTS 5,689,565 A    11/1997    Spies et al.
5,943,426 A    8/1999    Frith et al.
(Continued)

FOREIGN PATENT DOCUMENTS

CN    101183938 A    5/2008
CN    101834840 A    9/2010
(Continued)

OTHER PUBLICATIONS

Ge Mal to: End-to-end security bootstrapping for M2M applications;M2M(12)21_018_CR_102_690_Rel_2_Addition_of_End-to-ETSI DRAFT; M2M(12)21_018_CR_102_690_REL_2_ADDITION_OF END-TOEND_SECURITY SOLUTION, European Telecommunications Standards Institute (ETSI), 650, Route Des Lucioles ; F-06921 Sophia-Antipolis ; France, vol. SmartM2M, Jul. 6, 2012 (Jul. 6, 2012), pp. 1-15, XP014179827.
(Continued)

*Primary Examiner* — Darren B Schwartz
(74) *Attorney, Agent, or Firm* — BakerHostetler

(57) ABSTRACT

In a machine-to-machine/Internet-of-things environment, end-to-end authentication of devices separated by multiple hops is achieved via direct or delegated/intermediated negotiations using pre-provisioned hop-by-hop credentials, uniquely generated hop-by-hop credentials, and-or public key certificates, whereby remote resources and services may
(Continued)

be discovered via single-hop communications, and then secure communications with the remote resources may be established using secure protocols appropriate to the resources and services and capabilities of end devices, and communication thereafter conducted directly without the overhead or risks engendered hop-by-hop translation.

5 Claims, 32 Drawing Sheets

Related U.S. Application Data

(60) Provisional application No. 62/133,839, filed on Mar. 16, 2015.

(51) Int. Cl.
| | |
|---|---|
| H04L 9/32 | (2006.01) |
| G06F 21/64 | (2013.01) |
| H04L 29/08 | (2006.01) |
| H04W 4/70 | (2018.01) |
| H04W 84/18 | (2009.01) |
| H04L 9/08 | (2006.01) |

(52) U.S. Cl.
CPC ............ *H04L 63/06* (2013.01); *H04L 63/062* (2013.01); *H04L 67/12* (2013.01); *H04W 12/0609* (2019.01); *G06F 2221/2115* (2013.01); *H04W 4/70* (2018.02); *H04W 84/18* (2013.01)

(58) Field of Classification Search
CPC ...... H04L 9/3263; H04W 12/06; H04W 4/70; H04W 84/18; H04W 12/0609; G06F 21/64; G06F 2221/2115
See application file for complete search history.

(56) References Cited

U.S. PATENT DOCUMENTS

| | | | |
|---|---|---|---|
| 6,145,079 A | | 11/2000 | Mitty et al. |
| 6,826,690 B1 * | | 11/2004 | Hind ........................ G06F 21/31 713/173 |
| 7,036,010 B2 | | 4/2006 | Wray |
| 7,171,555 B1 | | 1/2007 | Salowey et al. |
| 7,353,541 B1 | | 4/2008 | Ishibashi et al. |
| 7,398,533 B1 * | | 7/2008 | Slaughter ................ H04L 67/16 719/328 |
| 7,437,558 B2 | | 10/2008 | Fenton et al. |
| 7,499,547 B2 | | 3/2009 | Zheng et al. |
| 7,506,368 B1 | | 3/2009 | Kersey et al. |
| 7,596,225 B2 | | 9/2009 | Mizikovsky et al. |
| 7,735,117 B2 | | 6/2010 | Nadalin et al. |
| 7,954,139 B1 | | 5/2011 | Hall |
| 7,966,652 B2 | | 6/2011 | Ganesan |
| 7,984,298 B2 | | 7/2011 | Wei et al. |
| 8,082,446 B1 | | 12/2011 | Carroll |
| 8,386,767 B2 | | 2/2013 | Barriga et al. |
| 8,418,241 B2 | | 4/2013 | Elzur |
| 8,423,759 B2 | | 4/2013 | Moreau |
| 8,452,966 B1 * | | 5/2013 | Petersen ................ G06F 21/51 713/168 |
| 8,484,467 B2 | | 7/2013 | Chan et al. |
| 8,578,159 B2 | | 11/2013 | Emeott et al. |
| 8,582,766 B2 | | 11/2013 | Yan |
| 8,583,929 B2 | | 11/2013 | Patel et al. |
| 8,621,221 B1 * | | 12/2013 | Arnold ............... H04W 12/0401 713/176 |
| 8,627,422 B2 * | | 1/2014 | Hawkes ................ H04L 63/166 726/5 |
| 8,644,510 B2 | | 2/2014 | Cakulev et al. |
| 8,745,374 B2 | | 6/2014 | Blom et al. |
| 8,769,288 B2 | | 7/2014 | Sundaram et al. |
| 8,850,545 B2 | | 9/2014 | Cha et al. |
| 8,856,509 B2 | | 10/2014 | Nakhjiri et al. |
| 8,856,941 B2 | | 10/2014 | Cha et al. |
| 8,881,257 B2 | | 11/2014 | Cha et al. |
| 8,887,246 B2 | | 11/2014 | Naslund et al. |
| 9,009,801 B2 | | 4/2015 | Shah et al. |
| 9,025,771 B2 | | 5/2015 | Dutta et al. |
| 9,137,740 B2 | | 9/2015 | Stanforth et al. |
| 9,167,422 B2 | | 10/2015 | Yan |
| 9,178,696 B2 | | 11/2015 | Blom et al. |
| 9,203,832 B2 | | 12/2015 | Thakore et al. |
| 9,319,220 B2 | | 4/2016 | Grewal et al. |
| 9,397,990 B1 | | 7/2016 | Taly et al. |
| 9,398,049 B2 | | 7/2016 | Fries et al. |
| 9,866,391 B1 | | 1/2018 | Crites et al. |
| 2001/0005883 A1 | | 6/2001 | Wray et al. |
| 2001/0023482 A1 | | 9/2001 | Wray |
| 2001/0037453 A1 * | | 11/2001 | Mitty .................... H04L 63/123 713/168 |
| 2002/0007453 A1 | | 1/2002 | Nemovicher |
| 2002/0087862 A1 | | 7/2002 | Jain et al. |
| 2002/0111913 A1 * | | 8/2002 | Tallent ................... G06Q 20/02 705/53 |
| 2002/0144109 A1 * | | 10/2002 | Benantar ................ H04L 9/006 713/156 |
| 2002/0152384 A1 | | 10/2002 | Shelest et al. |
| 2002/0153998 A1 | | 10/2002 | Litwin et al. |
| 2003/0115488 A1 | | 6/2003 | Kunito et al. |
| 2003/0182581 A1 | | 9/2003 | Isozaki |
| 2003/0204720 A1 * | | 10/2003 | Schoen ............... H04L 63/0823 713/153 |
| 2004/0030794 A1 * | | 2/2004 | Hugly ................... H04L 67/104 709/230 |
| 2004/0039906 A1 | | 2/2004 | Oka et al. |
| 2004/0039911 A1 | | 2/2004 | Oka et al. |
| 2004/0043756 A1 | | 3/2004 | Haukka et al. |
| 2004/0148504 A1 | | 7/2004 | Forsberg |
| 2004/0167984 A1 | | 8/2004 | Herrmann |
| 2004/0196978 A1 * | | 10/2004 | Godfrey ................ H04L 51/066 380/270 |
| 2004/0225878 A1 | | 11/2004 | Costa-Requena et al. |
| 2005/0036616 A1 | | 2/2005 | Huang et al. |
| 2005/0084100 A1 * | | 4/2005 | Spies ....................... H04L 47/10 380/30 |
| 2005/0120214 A1 | | 6/2005 | Yeates et al. |
| 2005/0154889 A1 | | 7/2005 | Ashley et al. |
| 2005/0201363 A1 | | 9/2005 | Gilchrist et al. |
| 2006/0004662 A1 * | | 1/2006 | Nadalin ................ H04L 9/0825 705/50 |
| 2006/0018483 A1 | | 1/2006 | Das |
| 2006/0053296 A1 | | 3/2006 | Busboom et al. |
| 2006/0106836 A1 | | 5/2006 | Masugi et al. |
| 2006/0206931 A1 | | 9/2006 | Dillaway et al. |
| 2006/0264202 A1 | | 11/2006 | Hagmeier et al. |
| 2006/0294366 A1 * | | 12/2006 | Nadalin ................ H04L 9/3265 713/156 |
| 2006/0294383 A1 | | 12/2006 | Austel et al. |
| 2007/0079382 A1 | | 4/2007 | Celikkan et al. |
| 2007/0124592 A1 | | 5/2007 | Oyama |
| 2007/0180229 A1 | | 8/2007 | Salowey et al. |
| 2007/0204160 A1 | | 8/2007 | Chan et al. |
| 2007/0220598 A1 | | 9/2007 | Salowey et al. |
| 2007/0260879 A1 | | 11/2007 | Dzung |
| 2007/0277035 A1 | | 11/2007 | Patel et al. |
| 2007/0294186 A1 | | 12/2007 | Yan |
| 2008/0022389 A1 | | 1/2008 | Calcev et al. |
| 2008/0065884 A1 | | 3/2008 | Emeott et al. |
| 2008/0065888 A1 | | 3/2008 | Zheng et al. |
| 2008/0072310 A1 | | 3/2008 | Dutta et al. |
| 2008/0104666 A1 | | 5/2008 | Dillaway |
| 2008/0115203 A1 | | 5/2008 | Elzur |
| 2008/0127317 A1 | | 5/2008 | Nakhjiri |
| 2008/0134311 A1 | | 6/2008 | Medvinsky et al. |
| 2008/0178004 A1 | | 7/2008 | Wei et al. |
| 2008/0178274 A1 | | 7/2008 | Nakhjiri et al. |
| 2008/0267189 A1 | | 10/2008 | Li |
| 2008/0282079 A1 | | 11/2008 | Yaghmour et al. |
| 2009/0006844 A1 | | 1/2009 | Wing et al. |

(56) References Cited

U.S. PATENT DOCUMENTS

| | | |
|---|---|---|
| 2009/0043901 A1 | 2/2009 | Mizikovsky et al. |
| 2009/0059842 A1 | 3/2009 | Maltseff et al. |
| 2009/0063851 A1 | 3/2009 | Nijdam |
| 2009/0080656 A1 | 3/2009 | Hughes et al. |
| 2009/0099860 A1 | 4/2009 | Karabulut et al. |
| 2009/0138711 A1 | 5/2009 | Heimbigner |
| 2009/0210696 A1 | 8/2009 | Moreau |
| 2009/0210699 A1 | 8/2009 | Grewal et al. |
| 2009/0210710 A1 | 8/2009 | Zheng et al. |
| 2009/0222541 A1 | 9/2009 | Monga et al. |
| 2009/0254745 A1 | 10/2009 | Ganesan |
| 2010/0017597 A1 | 1/2010 | Chandwani |
| 2010/0049980 A1 | 2/2010 | Barriga et al. |
| 2010/0088519 A1 | 4/2010 | Tsuruoka et al. |
| 2010/0138539 A1 | 6/2010 | Neville et al. |
| 2010/0192197 A1 | 7/2010 | Nadalin et al. |
| 2010/0257588 A1 | 10/2010 | Urien |
| 2010/0260337 A1 | 10/2010 | Song et al. |
| 2010/0268937 A1 | 10/2010 | Blom et al. |
| 2011/0047372 A1 | 2/2011 | Ganesan |
| 2011/0078448 A1* | 3/2011 | Chow .................. H04L 63/0823 713/175 |
| 2011/0258447 A1 | 10/2011 | Wei et al. |
| 2011/0302638 A1 | 12/2011 | Cha et al. |
| 2012/0023568 A1 | 1/2012 | Cha et al. |
| 2012/0042160 A1 | 2/2012 | Nakhjiri et al. |
| 2012/0191970 A1 | 7/2012 | Blom et al. |
| 2012/0198520 A1 | 8/2012 | Cha et al. |
| 2012/0260088 A1 | 10/2012 | Fries et al. |
| 2012/0272064 A1 | 10/2012 | Sundaram et al. |
| 2012/0288092 A1 | 11/2012 | Cakulev et al. |
| 2013/0007858 A1 | 1/2013 | Shah et al. |
| 2013/0041997 A1 | 2/2013 | Li et al. |
| 2013/0080769 A1 | 3/2013 | Cha et al. |
| 2013/0081113 A1* | 3/2013 | Cherian .............. H04W 12/003 726/4 |
| 2013/0117824 A1 | 5/2013 | Naslund et al. |
| 2013/0173922 A1* | 7/2013 | Falk ..................... H04L 9/3263 713/168 |
| 2013/0227658 A1 | 8/2013 | Leicher et al. |
| 2013/0227663 A1 | 8/2013 | Cadenas Gonzalez |
| 2013/0239169 A1 | 9/2013 | Nakhjiri |
| 2013/0246784 A1 | 9/2013 | Zhang et al. |
| 2013/0275574 A1 | 10/2013 | Hugard et al. |
| 2013/0297940 A1 | 11/2013 | Chan et al. |
| 2013/0298209 A1 | 11/2013 | Targali et al. |
| 2014/0169563 A1 | 6/2014 | Yan |
| 2014/0189350 A1 | 7/2014 | Baghdasaryan et al. |
| 2014/0250234 A1 | 9/2014 | Liesche et al. |
| 2014/0282957 A1 | 9/2014 | Thakore et al. |
| 2014/0331279 A1 | 11/2014 | Aissi et al. |
| 2014/0365777 A1 | 12/2014 | Cha et al. |
| 2015/0026471 A1 | 1/2015 | Cha et al. |
| 2015/0033024 A1 | 1/2015 | Mashima et al. |
| 2015/0033311 A1 | 1/2015 | Seed et al. |
| 2015/0033312 A1 | 1/2015 | Seed et al. |
| 2015/0067813 A1 | 3/2015 | Cha et al. |
| 2015/0245205 A1 | 8/2015 | Kim et al. |
| 2015/0296470 A1 | 10/2015 | Kim et al. |
| 2015/0326561 A1 | 11/2015 | Shah et al. |
| 2015/0373124 A1 | 12/2015 | Bhalla |
| 2016/0007137 A1 | 1/2016 | Ahn et al. |
| 2016/0014674 A1 | 1/2016 | Ahn et al. |
| 2016/0021118 A1 | 1/2016 | Roth et al. |
| 2016/0036854 A1* | 2/2016 | Himawan .............. H04L 63/104 726/5 |
| 2016/0044007 A1 | 2/2016 | Boudguiga et al. |
| 2016/0056959 A1 | 2/2016 | Blom et al. |
| 2016/0065362 A1 | 3/2016 | Choyi et al. |
| 2016/0087973 A1 | 3/2016 | Thakore et al. |
| 2016/0112436 A1* | 4/2016 | Kopp .................. H04L 63/126 726/1 |
| 2016/0112981 A1 | 4/2016 | Ahn et al. |
| 2016/0127341 A1 | 5/2016 | Yan |
| 2016/0164851 A1* | 6/2016 | Borovoy ............. H04L 63/0884 726/1 |
| 2016/0261570 A1 | 9/2016 | Grewal et al. |
| 2016/0277391 A1 | 9/2016 | Choyi et al. |
| 2016/0285844 A1 | 9/2016 | Olivereau et al. |
| 2016/0337354 A1 | 11/2016 | Smadja et al. |
| 2016/0373257 A1 | 12/2016 | Adrangi et al. |
| 2017/0005999 A1 | 1/2017 | Choyi et al. |
| 2017/0041231 A1 | 2/2017 | Seed et al. |
| 2017/0215026 A1 | 7/2017 | Kim et al. |
| 2017/0238279 A1 | 8/2017 | Jeong et al. |

FOREIGN PATENT DOCUMENTS

| | | |
|---|---|---|
| CN | 101980558 A | 2/2011 |
| CN | 102106135 A | 6/2011 |
| CN | 102215560 A | 10/2011 |
| JP | 2000-216767 A | 8/2000 |
| JP | 2008-234451 A | 10/2008 |
| JP | 2009-514050 | 4/2009 |
| JP | 2009-100462 A | 5/2009 |
| JP | 2015-501473 A | 1/2015 |
| JP | 2015-023375 A | 2/2015 |
| JP | 2015-026362 A | 2/2015 |
| KR | 10-2012-0090456 A | 8/2012 |
| WO | 2010/003713 A1 | 1/2010 |
| WO | 2015/013685 A1 | 1/2015 |
| WO | 20151013645 A1 | 1/2015 |

OTHER PUBLICATIONS

Kato et al., "A Proposal of an Automatic Negotiation Method for Users' Requests Not-complying with Network: Security Policies in the Network to be Used", Multimedia, Distributed, Cooperative and (DICOMO 2005) Mobile Symposium, Jul. 6, 2005, 6 pages.

Neisse et al., "Enforcement of Security Policy Rules for the Internet of Things", 2014 Third International Workshop on Internet of Things(Lot) Communications and Technologies, 2014, 9 pages.

Sanzgiri, et al., "A Secure Routing Protocol for Ad Hock Networks" University of Massachusetts Amherst Computer Science Department Faculty Publication Series 49, 2002, 11 pages.

Rescorla, E. and Modadugu, N., "Datagram Transport Layer Security Version 1.2", Internet Engineering Task Force (IETF), RFC# 6347, Jan. 2012, 30 pages.

OneM2M Technical Specification,TS-0003 V 0.7.0, "OneM2M Security Solutions", Aug. 1, 2014, 91 pages.

OneM2M Technical Specification TS-0003 V1.0.1, "Security Solutions", Jan. 30, 2015, 91 pages.

OneM2M Technical Specification TS-0001 V1.6.1, "Functional Architecture", Jan. 30, 2015, 321 pages.

OneM2M Partners Type 1 (One M2M Technical Report Document No. Document Name: oneM2M End-to-End Security and Group Authentication, Sep. 29, 2014, OneM2MPartners.

Meyerstein, M., "Ticket #12: Gateway and Device Protection", European Telecommunications Standards Institute (ETSI), M2M #11 Meeting, Philadelphia, USA, Sep. 13-17, 2010.

Kent, S. and Seo, K., "Security Architecture for the Internet Protocol", Network Working Group, RFC# 4301, Dec. 2005, 101 pages.

Kalita, H. and Kar, A., "A New Algorithm for End to End Security of Data in a Secure Self Organized Wireless Sensor Network", Journal of Global Research in Computer Science, Oct. 2010, 1(3), 28-34.

International Application No. PCT/US2016/022625: International Search Report and the Written Opinion dated May 31, 2016, 13 pages.

International Application No. PCT/US2015/058368: International Search Report and the Written Opinion dated Jun. 30, 2016, 14 pages.

European Telecommunications Standards Institute (ETSI) TS 102 690 V1.1.1, "Machine-to-Machine communications (M2M); Functional Architecture", Oct. 2011, 280 pages.

Dierks, T., "The Transport Layer Security (TLS) Protocol Version 1.2", Network Working Group, RFC# 5246, Aug. 2008, 104 pages.

(56) References Cited

OTHER PUBLICATIONS

OneM2M-TR-0012-V-0.2.1 "oneM2M End-to-End Security and Group Authentication" Sep. 29, 2014, 15 pages.
Armknecht, et al., "Cross-layer Privacy Enahncement and Non-repudiation in Vehicular Communication", Feb. 2007, 13 pages.

* cited by examiner

Fig. 10

```
{"keys":
  [
    {"kty":"RSA",
     "use":"sig",
     "key_ops":"sign",
     "kid":"Entity2-Context1",
     "n": "0vx7agoebGcQSuuPiLJXZptN9nndrQmbXEps2aiAFbWhM78LhWx
4cbbfAAtVT86zwu1RK7aPFFxuhDRiL6tSoc_BJECPebWKRXjBZCiFV4n3oknjhMs
tn64tZ_2W-5JsGY4Hc5n9yBXArw193lqt7_RN5w6Cf0h4QyQ5v-65YGjQR0_FDW2
QvzqY368QQMiCAtaSqzs8KJZgnYb9c7d0zgdAZHzu6qMQvRL5hajrn1n91CbOpbI
SD08qNLyrdkt-bFTWhAI4vMQFh6Wezu0fM4lFd2NcRwr3XPksINHaQ-G_xBniIqb
w0Ls1jF44-csFCur-kEgU8awapJzKnqDKgw",
     "e":"AQAB"},
    {"kty":"RSA",
     "use":"enc",
     "key_ops":"encrypt",
     "kid":"Entity2-Context2",
     "n": "vrjOfz9Ccdgx5nQudyhdoR17V-IubWMeOZCwX_jj0hgAsz2J_pqYW08
PLbK_PdiVGKPprqzmDIsLI7sA25VEnHU1uCLNwBuUiCO11_-7dYbsr4iJmG0Q
u2j8DsVyT1azpJC_NG84Ty5KKthuCaPod7iI7w0LK9orSMhBEwwZDCxTWq4a
YWAchc8t-emd9qOvWtVMDC2BXksRngh6X5bUYLy6AyHKvj-nUy1wgzjYQDwH
MTp1CoLtU-o-8SNnz1tmRoGE9uJkBLdh5gFENabWnU5m1ZqZPdwS-qo-meMv
VfJb6jJVWRpl2SUtCnYG2C32qvbWbjz_jBPD5eunqsIolvQ",
     "e":"BBBQ"}
  ]
}
```

END-TO-END AUTHENTICATION AT THE SERVICE LAYER USING PUBLIC KEYING MECHANISMS

CROSS-REFERENCE TO RELATED APPLICATIONS

This application is a continuation of U.S. patent application Ser. No. 15/071,659, "End-To-End Authentication at the Service Layer Using Public Keying Mechanisms" (Choyi, et al.) filed Mar. 16, 2016, and claims the benefit of U.S. Provisional Pat. App. No. 62/133,839, "End-To-End Authentication at the Service Layer Using Public Keying Mechanisms" (Choyi, et al.) filed Mar. 16, 2015, the contents of both of which is hereby incorporated by reference in its entirety.

BACKGROUND

Machine-To-Machine (M2M) and Internet-Of-Things (IoT) network deployments may support M2M/IoT service layers such as oneM2M, ETSI M2M, and OMA LWM2M operating across nodes such as M2M/IoT servers, gateways, and devices which host M2M/IoT applications and services. Operations of these kinds are described in, for example: the oneM2M-TS-0001 Functional Architecture-V-1.6.1; oneM2M-TS-0003 Security Solutions-V-1.0.1; the Transport Layer Security (TLS) Protocol Version 1.2, IETF—RFC 5246; the Datagram Transport Layer Security (DTLS) Version 1.2, IETF—RFC 6347; and the Security Architecture for the Internet Protocol (IPSec), IETF—RFC 4301.

SUMMARY

A Service Enablement and Security Configuration (SESC) method is described. This involves identifying the right set of security features, associated attributes and parameters that may be used by an entity within a M2M network in order that secure communications may be established. The steps entail identifying the capability of an entity and the services offered by the entity and making a determination of the security features. E.g., if an entity does not provide a "critical" service, then an expensive E2E authentication process may be avoided. However, if the service or information provided by an entity is deemed "critical" and therefore requires E2E authentication, then any messaging involved with the critical service may be required to be authenticated in an E2E manner. Mechanisms to make this determination are described in this document. The Service Enablement Function (SEF) may optionally indicate that only E2E authentication is required thus avoiding expensive hop-by-hop (HbH) secure connections. Similarly the SEF may optionally indicate that it performs the Credential Registry (CR) functionality as well. The SEF may also optionally provide a link or indicate a location to a CR from which credentials may be requisitioned.

A Secure Credential Requisition/Registration Process (SCRP) is described. This involves requesting for public key credentials that may be used for E2E authentication in a dynamic manner. The process may also involve registration of credentials with a credential registry. A dynamic Credential Registration/Requisition as a Service (CRaaS) at the service layer is also described, along with life-cycle management of credentials which may include re-provisioning of credentials.

A Third-Party Credential Requisition (TPRC) method is described. This includes mechanisms for requisition of third-party's credentials by an entity. Any entity that may require an E2E authentication of the message originator may be provided with E2E credentials which may be used for E2E authentication provided access control privileges have been evaluated. The credential requisition may be performed by implicit means, whereby the credentials and associated parameters may be available as part of the resource. Alternatively, the credential requisition may be performed by explicit means, whereby the credentials may be fetched from a Trusted Third Party (TTP).

An End-to-End Authentication Process (E2EAP) is described. This includes mechanisms for performing E2E Message originator's authentication and the ability to perform the authentication in a delegated or non-delegated mode. The E2E authentication may involve one-way authentication or mutual E2E authentication. For example, mechanisms for creating "message originator information" that may be used to create a meta-data that can be used to perform E2E authentication is described. In a delegated mode, the entity offloads E2E authentication mechanisms to a trusted entity. Mechanisms described in the disclosure are applicable to environments that involve Authentication and more particularly to E2E authentication of Entities that are considered to be constrained (e.g., IoT/M2M devices). However, the process is not limited to just IoT devices. It can be used where a trusted entity may determine appropriate security features, functions and credentials in order to relieve messaging overhead involved in the system as a whole in addition to relieving constrained devices from performing complex security functions. The mechanisms described here may also be used to provide for confidentiality and integrity of service layer messages in an E2E manner.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 10 illustrates example JavaScript Object Notation (JSON) representation of keys that may be provisioned to an Application Entity (AE) or a CSE.

DETAILED DESCRIPTION OF ILLUSTRATIVE EMBODIMENTS

Figure 1:
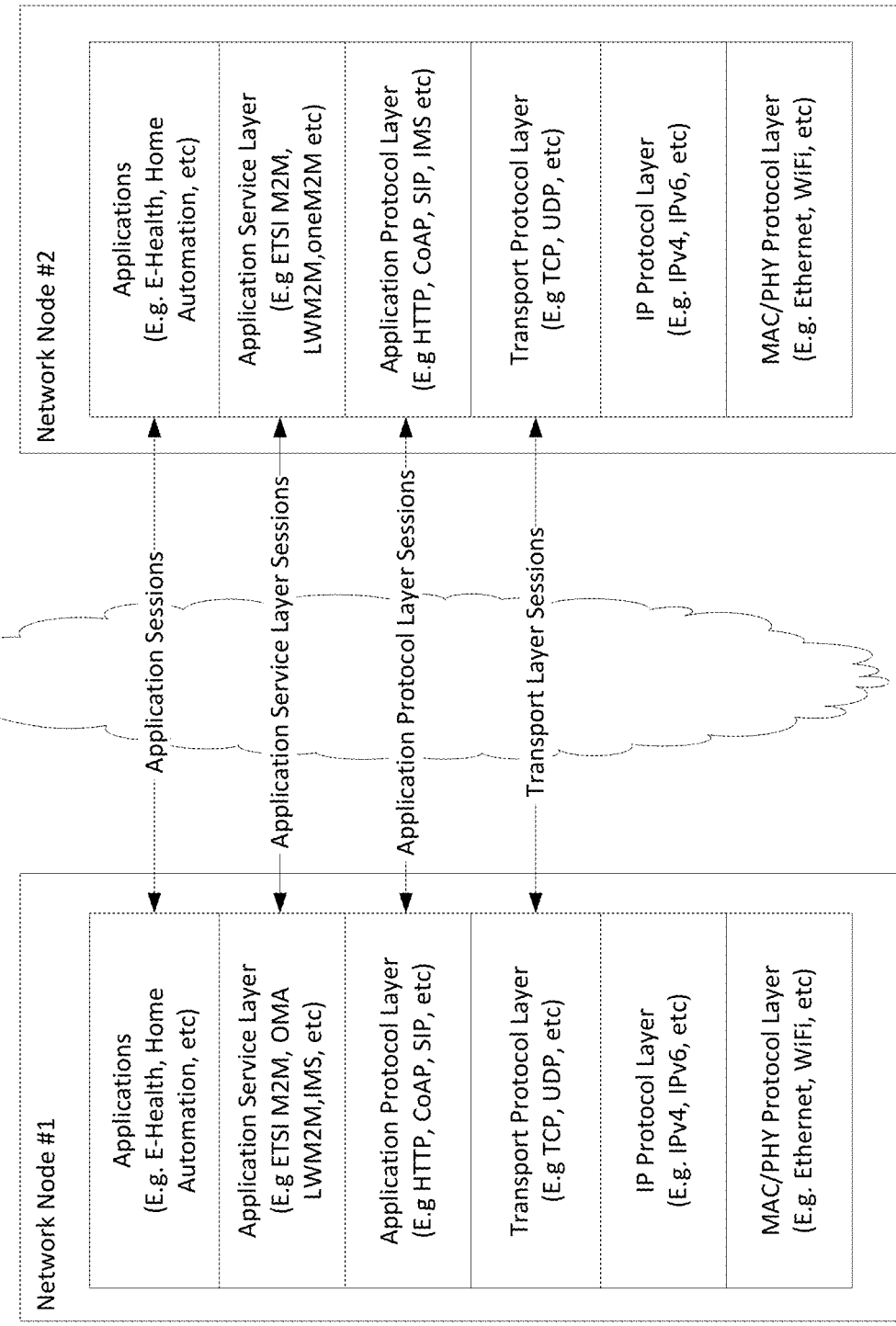
FIG. 1 illustrates communication sessions implemented as part of protocols and services at various layers in a network protocol stack.

This document describes mechanisms to perform End-to-End authentication between entities having diverse capabilities (e.g., differing processing power, memory size, etc.) and with no prior security associations. Security provisioning and configuration procedures are described so that appropriate public key-based security credentials, functions, scope and parameters may be provisioned to an Entity. Mechanisms to request and distribute security credentials to other entities which could then use the credentials to perform an End-to-End authentication at the Service Layer are also developed.

A Service Enablement and Security Configuration (SESC) method is described. This involves identifying the right set of security features, associated attributes and parameters that may be used by an entity within a M2M network in order that secure communications may be established. The steps entail identifying the capability of an entity and the services offered by the entity and making a determination of the security features. For example, if an entity does not provide a "critical" service, then an expensive E2E authentication process may be avoided. However, if the service or information provided by an entity is deemed "critical" and therefore requires E2E authentication, then any messaging involved with the critical service may be required to be authenticated in an E2E manner. Mechanisms to make this determination are described in this document.

As part of the SESC process, the SEF may optionally indicate that only E2E authentication is required thus avoiding expensive Hop-by-Hop (HbH) secure connections. Similarly, the SEF may optionally indicate that it performs the CR functionality as well. Further, the SEF may optionally provide a link or indicate a location to a CR from which credentials may be requisitioned.

A Secure Credential Requisition/Registration Process (SCRP) is described. This involves requesting for public key credentials that may be used for E2E authentication in a dynamic manner. The process may also involve registration of credentials with a credential registry. A dynamic Credential Registration/Requisition as a Service (CRaaS) at the service layer is described. Life-cycle management of credentials is described, which may include re-provisioning of credential.

A Third-Party Credential Requisition (TPRC) process is described. This includes mechanisms for requisition of third-party's credentials by an entity. Any entity that may require an E2E authentication of the message originator may be provided with E2E credentials which may be used for E2E authentication provided access control privileges have been evaluated. The credential requisition may be performed by implicit means, whereby the credentials and associated parameters may be available as part of the resource. Conversely, the credential requisition may be performed by explicit means, whereby the credentials may be fetched from a TTP.

An End-to-End Authentication Process (E2EAP) is described. Mechanisms for performing E2E Message originator's authentication are described. The ability to perform the authentication in a delegated or non-delegated mode is explained. The E2E authentication may involve one-way authentication or mutual E2E authentication. Mechanisms are described for creating "message originator information" that may be used to create meta-data which can then be used to perform E2E authentication. In a delegated mode, the entity offloads E2E authentication mechanism to a trusted entity.

Mechanisms described herein are applicable to environments that involve authentication and more particularly to E2E authentication of entities that are considered to be constrained (e.g., certain IoT/M2M devices.) However, it is understood that the systems and methods described herein are not limited to just IoT devices. Such systems and methods can be used wherever a trusted entity may determine appropriate security features, functions and credentials in order to relieve messaging overhead involved in the system as a whole in addition to relieving constrained devices from performing complex security functions. Even though, the illustrative examples in this document often relate to E2E authentication of the message originator, the mechanisms described here may be used to provide confidentiality and integrity of service layer messages in an E2E manner.

Communication Session

A typical communication session typically involves a persistent interactive exchange of information between two or more communicating entities (e.g., devices, applications, etc.). However, with current RESTful approach, there is no real persistent connection but an on-demand request/response message. A communication session is established at a certain point in time, and torn down at a later point in time based on various circumstances (e.g., after the session times out or when one of the entities decides to terminate the session). A communication session typically involves the exchange of multiple messages between entities and is typically stateful, meaning that at least one of the communicating entities need to save information about the session history in order to be able to maintain the communication session (e.g., security context such as credentials, identifiers, etc.). Communication sessions may be implemented as part of protocols and services at various layers in a network protocol stack. As an example, FIG. 1 shows communication sessions established between network nodes at the transport protocol layer, application protocol layer, application service layer, and between applications.

Application Service Layer

An M2M service layer is an example of one type of application service layer specifically targeted towards providing value-added services for M2M type devices and applications. For example, an M2M service layer can support Application Programming Interfaces (APIs) providing applications and devices access to a collection of M2M centric capabilities supported by the service layer. A few examples include security, charging, data management, device management, discovery, provisioning, and connectivity management. FIG. 1 depicts the common services function (CSF) that is specified by the oneM2M specifications.

These functions/capabilities are made available to applications via APIs which make use of message formats, resource structures and resource representations defined by the M2M service layer. A growing trend in the standardization of M2M network technologies has been the standardization of the M2M Service Layer. An example includes the oneM2M TS-0001 Functional Architecture V-1.6.1.

M2M Service Layer Session

A M2M service layer session is a communication session established between a M2M service layer instance and either a M2M application or another M2M service layer instance.

A M2M service layer session can consist of M2M service layer state related to connectivity, security, scheduling, data, context, etc. This state can be maintained by the M2M service layer, a M2M application, or both.

A M2M service layer session can be layered on top of one or more underlying lower layer communication sessions. In doing so, session state can be shared and leveraged between the different sessions (e.g., security credentials, congestion information, etc.). In addition, a M2M service layer session can support persistency with regards to lower layer sessions such that the M2M service layer session can persist and be maintained independent of lower layer sessions being setup and torn-down.

Some examples of lower layer sessions that a M2M service layer session can be layered on top of include but are not limited to application protocol layer sessions (e.g., HTTP or CoAP) and transport protocol layer sessions (e.g., TCP and/or UDP) which may be secured using protocols such as Transport Layer Security (TLS for TCP) or Datagram Transport Layer Security (DTLS for UDP).

oneM2M Service Layer Security

Currently, when oneM2M endpoints communicate with one another in a secure manner, the nodes and intermediate nodes establish security association with one another in a hop-by-hop manner. Each hop (AE↔CSE or CSE↔CSE) has a separate security association and independent of one another. Hop-by-hop security associations may be established by means of symmetric keys, using certificates or by a bootstrapping process which may be performed by a direct process or by means of an infrastructure. Also, oneM2M-TS-0003 Security Solutions-V-1.0.1 states that: "At the service layer level, the security association establishment results in a TLS or DTLS session which protects messages being exchanged between adjacent AE/CSE, i.e. hop-by-hop."

Figure 3:
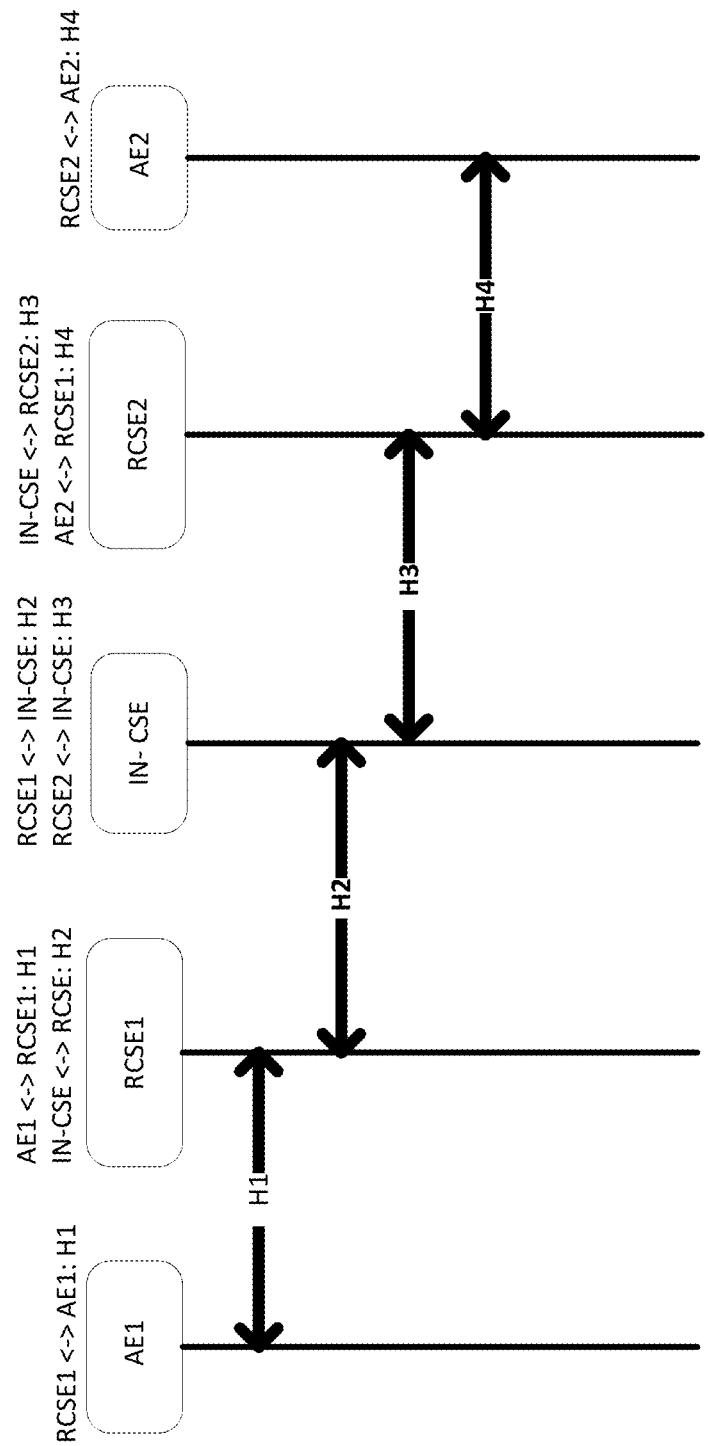
FIG. 3 illustrates an example of hop-by-hop security associations.

FIG. 3 highlights Hop-by-Hop (HbH) security association between entities by means of (D)TLS secure associations using credentials that are unique and confidential to the two communicating entities that are involved. As can be observed, AE1 and RCSE1 create a secure (D)TLS connection based on HbH credentials (H1), that is shared by the two entities (AE1, RCSE1). Similarly, RCSE1 and IN-CSE1 have setup a secure (D)TLS connection using H2 credentials, H3 is used for creating (D)TLS connection between IN-CSE and RCSE2, similarly, H4 is used to create the secure connection between AE2 and RCSE2.

If RCSE1 wanted to communicate information to AE2, then the information is first sent through the (D)TLS connection between RCSE1 and IN-CSE. The information is then processed at the service layer and then sent re-packaged and sent through a newer (D)TLS tunnel between IN-CSE and RCSE2. The RCSE2 processes the message and then re-tunnels the message through a different secure tunnel between RCSE2 and AE2. As it can be observed the communications between any two HbH entities is secured by (D)TLS and therefore breach in confidentiality or integrity of messages that are in-transit between the Entities is extremely difficult since they are protected by (D)TLS connection So, it is extremely difficult to breach the messages in transit, however, messages may not be protected at the node before it is being forwarded to the next hop.

TABLE 1

| | Abbreviations |
|---|---|
| AE | Application Entity |
| AES | Advanced Encryption Standard |
| CR | Credential Registry |
| CRaaS | Credential Registration/Requisition as a Service |
| DES | Digital Encryption Standard |
| DS | Digital Signature |
| DTLS | Datagram Transport Layer Security |
| E2E | End-to-End |
| HCSE | Hosting CSE |
| HCSE | Hosting CSE |
| IoT | Internet-of-Things |
| IPSec | Internet Protocol Security |
| JWS | JSON Web Signature |
| JWT | JSON Web Token |
| KDF | Key Derivation Function |
| M2M | Machine-to-Machine |
| MAC | Message Authentication Code |
| NTP | Network Time Protocol |
| PKI | Public Key Infrastructure |

TABLE 1-continued

Abbreviations

| | |
|---|---|
| PSK | Pre-Shared Key |
| RCSE | Registrar CSE |
| SCRP | Security Credential Requisition/Registration Process |
| SEF | Service Enabling Function |
| SESC | Service Enabling and Security Configuration |
| SP | Service Provider |
| TLS | Transport Layer Security |
| TTP | Trusted Third Party |

IOT and Security Terminologies

Authenticator: An entity that performs authentication procedure in order to authenticate another entity so that access to application, service, resource or network may be provided to that entity.

Authenticatee: An entity requesting access to a resource, application, service or network and in the process of being authenticated by an authenticator Authentication: The process of establishing confidence in the identity associated with an entity.

Confidentiality: The process of ensuring that only an authorized entity is able to view data Entity: An application, a sub-set of applications, service enabling function(s), device (e.g., a sensor device).

End-to-End Authentication: Provides an entity with the ability to validate another entity's identity that was supplied as part of the message. The communicating entities are assumed to be multiple hops away. The authentication may be mutual or uni-directional.

Integrity: Confidence, or the process of establishing confidence, that a message or a system has not been altered by an un-authorized entity IoT: Connecting uniquely identifiable objects and their virtual representations to the Internet M2M Service Layer: A software middleware layer that supports value-added services for M2M applications and devices through a set of Application Programming Interfaces (APIs) and underlying networking interfaces.

M2M Service Layer Hop: A M2M service layer communication session between two M2M service layers or between a M2M service layer and a M2M application.

M2M Service Layer Session: An established exchange of messages between two or more communicating entities that is typically stateful in nature.

M2M Service Layer Session Endpoint: A logical entity that can be the source or sink of M2M Service Layer Session communication.

M2M Service Layer Session Manager: A logical entity that provides services for M2M Service Layer Session management.

Figure 4:
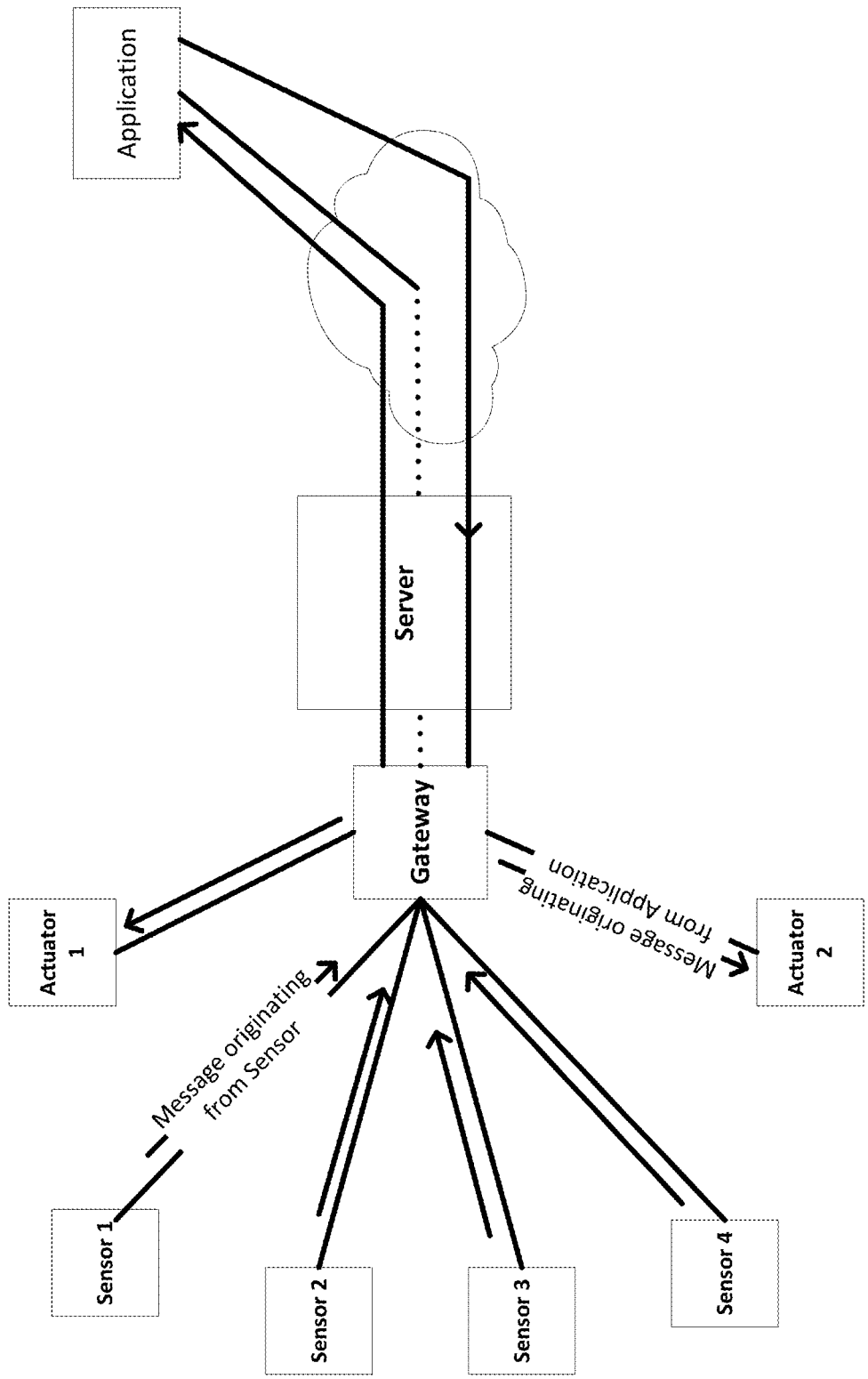
FIG. 4 illustrates an example M2M scenario.

Nonce: Random Value which may be associated with a session and whose validity may be associated with session/time component Example Challenges Addressed A service provider makes use of sensors, application entities, and actuators using the service layer functions in order to provide services such a remote fire control for customers. Various use cases (burglary detection, monitoring industrial systems and rectification etc.) wherein remote M2M systems may be used for both detection, action as well as for mitigation and may have similar security requirements as the ones we are describing here. An example scenario is depicted in FIG. 4. Sensors 1-4 provide sensor data via service layer messaging which may be transported to an application via the intermediate nodes. The application in turn based on sensor data may trigger the actuators to perform some action.

A use case, where a home is equipped with smoke detection sensors, which are used to trigger an alarm to a fire detection and extinguishing Service Company. A system at the company processes sensor information and based on the alarm may infer if the smoke is due to cooking, someone smoking a cigarette or a bad smoke sensor. The system also uses other sensors within the home or neighbor's home etc. in order to determine if it is truly a fire and in addition may also use other sensors in order to determine if the fire is Class A fire or other types of fire. If it is an electrical fire, then the sprinkler system must not be turned-on. The system may then trigger the actuators that control electricity to be shut-off before the actuators controlling the water sprinkling system to be turned-on. Or in an industrial setting, then certain chemicals may be used, the decision on what is used may also be determined based on if people/pets are stuck within the home/building.

From a security perspective and more precisely from an authentication perspective, which is the focus of this document, the system (application) must make sure that the indications of the smoke alarm were actually triggered by an entity (e.g., smoke alarm), with which the system has a trust relationship and can verify with a high degree of assurance that the message did indeed originate from that specific sensor. From the perspective of the actuators, the actuators need to know that the message to turn-on the water sprinkler originated from a system (application) with which it has a trust relationship.

The current oneM2M specifications only provide for a hop-by-hop security mechanism. The smoke alarm that was sent by the smoke sensor using oneM2M messaging, cannot be authenticated by the system (Application) to have been originated from the sensor with a high degree of assurance. An entity or entities that transport the messages in a hop-by-hop manner at the service layer from the sensor to the system may be able to change the message type. It is possible for an intermediate entity to change the message to indicate that type of fire is a "Class A fire" (usual fire from burning paper for example), when in fact it could have been a "Class C fire". The intermediate entity may be malicious but in some cases could have some buggy code and therefore did not send the messages properly. If messages from the system (application) to an actuator is modified by intermediate entities then it may have disastrous consequences as well.

The oneM2M TS-0003 Security Solutions V-1.0.1, only provide for hop-by-hop authentication, therefore an Entity that is requesting to perform Create/Retrieve/Update/Delete/Notify operations on a remotely hosted service layer resource is not explicitly authenticated by the remote host. The remote host may be an entity that is either hosting the resource or the entity that created the resource. In addition, an Entity that wishes to authenticate the original message originator has no ability to perform the authentication with a high-degree of assurance. As stated earlier, that breach in confidentiality or integrity of messages that in-transit between any two HbH entities is extremely difficult, however, that does not stop a compromised entity from sending impersonation message to a another supposedly "trusted" entity, a kind of man-in-the-middle attack but more precisely, an impersonation attack. The end entity is not able to verify that the message originated from the right entity or not because of the lack of such verification capability. The kind of compromise may be either caused by malicious intent or non-malicious mechanisms (e.g., bad code, configuration issues etc.).

Figure 5:
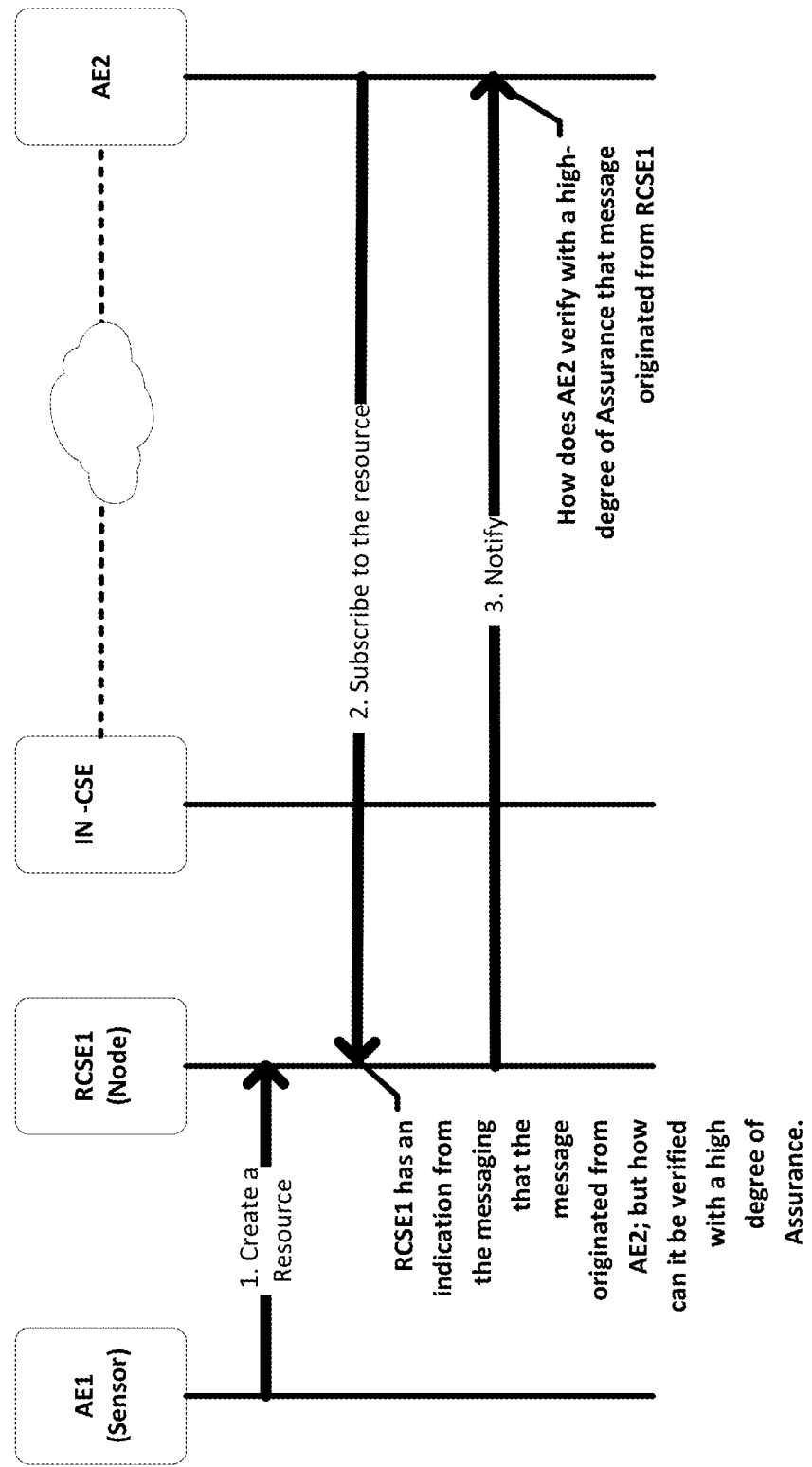
FIG. 5 illustrates a problem of not being able to authenticate the originator of a message.

FIG. 5 illustrates a scenario wherein an entity AE1 creates a resource that is hosted at RCSE1 and another entity AE2, would like to subscribe to the resource. AE2 sends a request to subscribe to the resource, however, RCSE1 does not know if the actual request to subscribe to the resource actually originated from AE2 or not. The message to subscribe may have been protected using HbH mechanism from AE2 to its next hop (e.g., IN-CSE) and from IN-CSE to RCSE1, however, RCSE1 may not be able to verify if either IN-CSE or any other entity had created their own message or not and if IN-CSE is masquerading as AE2, since only HbH authentication is performed at each of the hops. Similarly, when the RCSE1 sends a "notification" message to AE2, the AE2 cannot verify with a high-degree of assurance that the "Notify' message actually originated from RCSE1.

Figure 6:
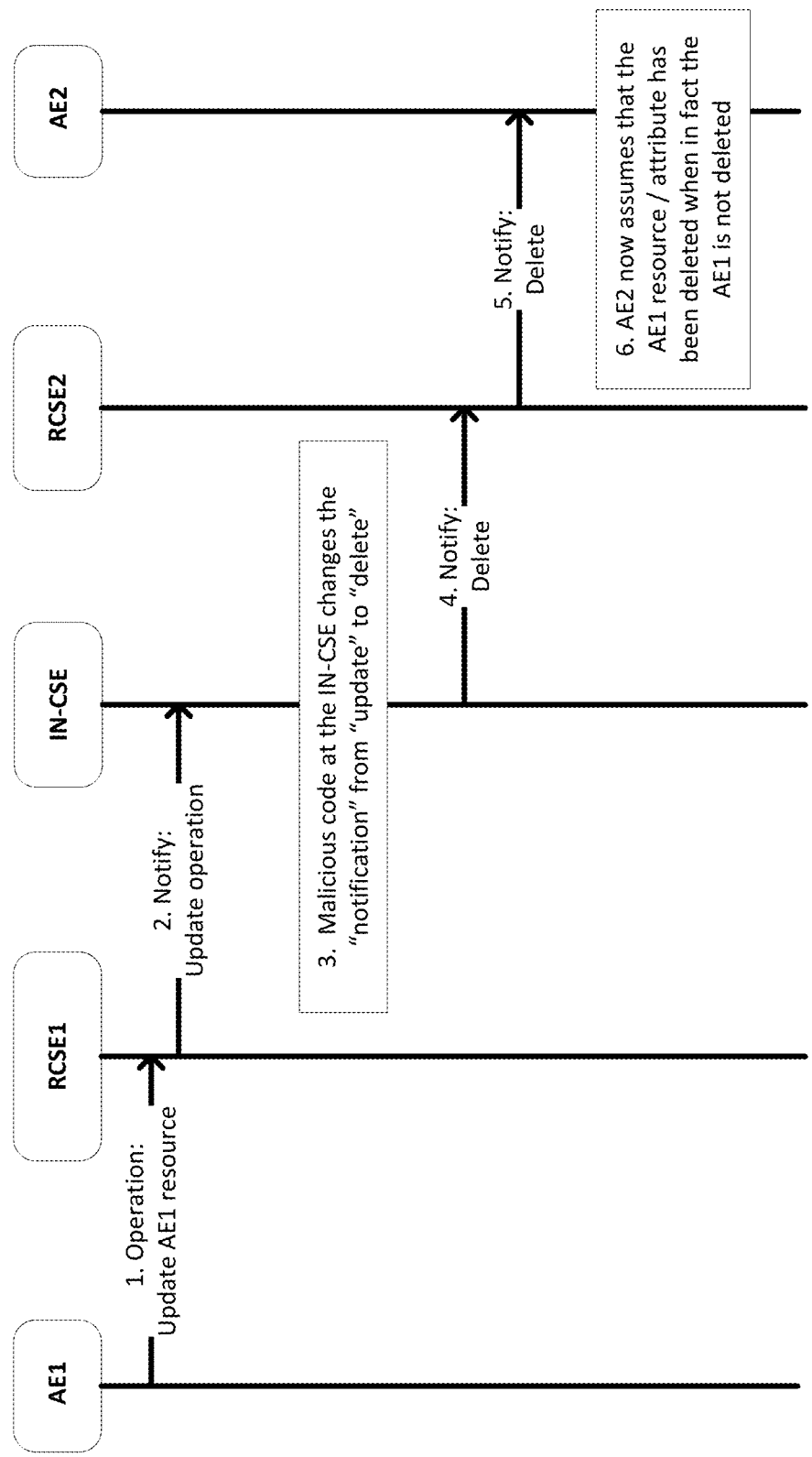
FIG. 6 illustrates a problem of an IN-CSE maliciously creating a newer message and forwarding to a registrar CSE.

Illustrated in FIG. 6, an Entity AE1, that performs an operation to update a resource registered with its Registrar CSE (RCSE1). The RCSE1 sends a notification message to entities that may have subscribed to the resource associated with AE1. The notification may be forwarded in a hop-by-hop manner from the RCSE1 to RCSE2 via an IN-CSE. It is assumed here that the IN-CSE may have been compromised by either a malicious or non-malicious entity and therefore the IN-CSE instead of forwarding the notification indicating an "Update" may instead send a "Delete" notification. The compromise may involve exploiting vulnerabilities that exist on the system and/or entail stealing of HbH credentials and/or un-authorized changes to the code running on the IN-CSE, and/or modifications of configuration parameters etc. At the third hop, after being processed at the service layer at the IN-CSE, since the message is protected using hop-by-hop security association and transported via a secure (D)TLS connection, the RCSE2 would trust the message since it is. Therefore even a message that originated from a compromised entity would be trusted since it is transported within a secure tunnel. In addition, the IN-CSE may be able to create any number of messages on its own and impersonate an AE or even RCSE1. Since an entity that hosts a resource or that is responsible for creation of a resource or responsible for taking actions based on updates to a resource is only able to authenticate the immediate hop away from it, therefore any message(s) originating more than a hop away from the entity cannot be authenticated with a high-degree of assurance.

Entity hosting the resource is not able to completely authenticate the Entities that are trying to perform operations on the resource since the target entity is only able to authenticate the entity that is one hop away from it. And therefore, access control may not be easily enforceable since the end entity is not able to verify with a high degree of assurance as to who actually initiated the message. From an end entity's perspective only the forwarder is authenticated because of a lack of E2E authentication mechanism.

Any intermediate entities (IN-CSE) may be able to impersonate messages on behalf of other intermediate entities because of hop-by-hop mechanisms.

Since hop-by-hop mechanisms are to be protected using (D)TLS, at each hop (D)TLS session will have to be setup, integrity protecting and authenticating at each hop and possibly encrypting and decrypting at each of the hops which may involve a lot of security related overhead (e.g., messaging overhead as well as cryptographic operations overhead) on resource constrained middle nodes.

In order that an entity would be able to authenticate another entity that may be more than a hop away, it would require that the authenticating entity, which is referred to as the authenticator, is provisioned with the credentials associated with the authenticatee (entity that would be authenticated).

Figure 7:
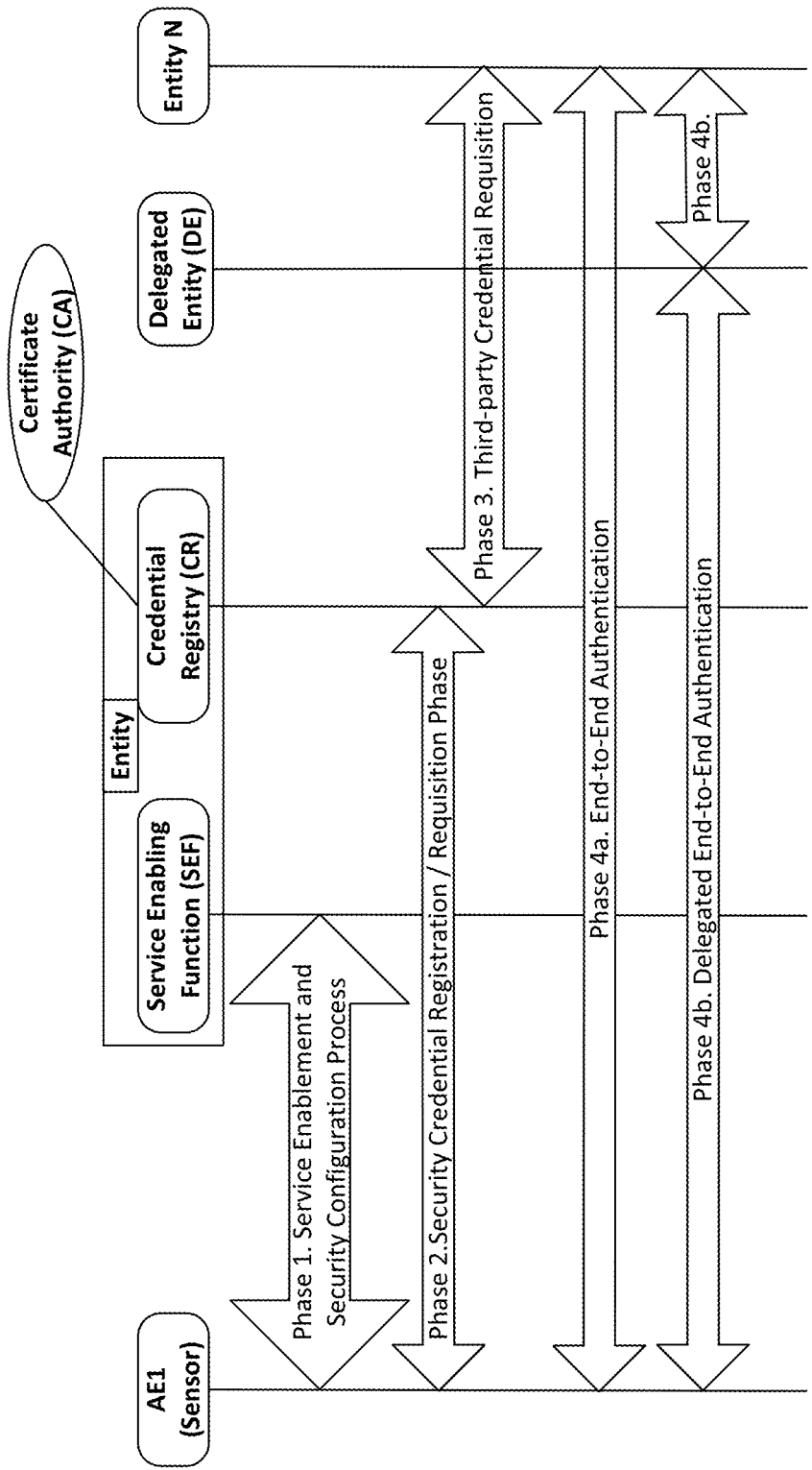
FIG. 7 illustrates an example set of end-to-end security authentication steps.

Referring to FIG. 7, if Entity N (Authenticator), which may be an application, would like to authenticate messages originating from Entity A (Authenticatee), which may be a sensor, then Entity N would have to be provisioned with Entity A's public key credentials. However, it is not sufficient to distribute the credentials but also to provide the information on how the credentials are to be used from a cryptographic process and more precisely the scope of how the message authentication is to be carried out. The scope may define the message header or sub-set of the message header, or parts of the message or even the whole message itself that are to be used to create an authentication tag, as well as key sizes, length of the digital signature, whether random values have to be used etc. In addition, mechanisms must be in place to select and provision the appropriate public key credentials and associated scope that are suitable for use with that Entity (e.g., Authenticatee), considering that some if not all of the entities may be constrained from resource and computing perspective. Also credential distribution of authenticatee's credentials to an Authenticator must be setup and it must be ensured that the credentials and scope are also appropriate for the Authenticator. If the right type of credentials that may be appropriate from a computing perspective is not made available, then alternate authentication mechanisms may be carried out wherein E2E authentications are delegated to another entity that may have higher computing resources or alternatively, newer credentials may be derived that may be suitable to both the Authenticator and the Authenticatee. Apart from an Authenticator and an Authenticatee, other functions such as a Service Enablement Function (SEF) and a Credential Registry (CR) may be required in order to carry out an E2E authentication process.

The role of the SEF is to provision an Entity with the right set of policies for security, security features that are to be enabled, type of credentials to be generated/provisioned, the type of crypto-graphic algorithms and protocols that may be used and other supplementary configuration parameters and scope in order to enable secure operations. The SEF makes a determination of the right set of security features based on the type of service offered by an Entity and therefore may have to be cognizant of the service capabilities of the entity. In certain embodiments, the SEF may provide mechanisms in order to provision an entity with the right set of application packages for enabling secure functions by interacting optionally with a device management server.

The CR may reside as part of another entity within the same M2M SP network and the main role of the CR is to provision an entity with the appropriate credentials and contexts and scope on how the credentials may be used. The SEF and the CR functionalities may be implemented as functions residing on different entities as part of the M2M Service Provider (SP) network or may reside on a single entity within the network. Alternatively, the CR may optionally connect to another CR or Certificate Authority (CA) that may belong and reside on a Trusted Third-Party entity outside of the M2M SP network. The role of the CR is to provision the right set of credential(s) that may be associated with a local or global identity.

In alternate embodiments, a Delegated Entity (DE), which may carry out authentications on behalf of an entity (Authenticator: Entity N) may also be present. A high-level description of the various steps that may be involved in enabling E2E authentication at the service layer based on public-key credentials is briefly described here.

End-to-End Authentication may entail the following steps as illustrated in FIG. 7.

Step 1 Service Enablement and Security Configuration (SESC): At this step an Entity A establishes an association with a Service Enabling Function (SEF). The SEF may need to be cognizant of the type of service offered by the Entity A and therefore selects the security features that are appropriate to Entity A. It is assumed here, that Entity N may have performed a SESC process with its own SEF before-hand. One of the primary goals of the SESC process may be to register the type of service requested or offered by Entity A at the SEF. In addition, the security requirements and features required or requested by the Entity A are also identified by the SEF. The SEF may be hosted by e.g., a M2M Service Provider or by the Manufacturer of Entity A or by an Application Provider/Device Manager (DM). In some instances, the SESC process may be skipped if an entity has been pre-provisioned with the appropriate security features and functions and associated policies that govern the usage of the features/functions. In such a scenario, only Steps 2-4 may be performed.

Step 2 is Security Credential Registration/Requisition Process (SCRP). Based on the security requirements and features that have been identified as part of Step1 or in the case where the security features have been pre-provisioned, the Entity A registers its public key credentials or is provisioned by appropriate public key credentials by a CR. The credentials that are registered are those that may be applicable for E2E Authentication. The credentials may be raw public keys or public keys that may have an associated public key certificate (e.g., X.509). The CR may in some instances use other network entities (e.g., a CA) in order to issue public key certificates that may be globally acceptable. The credentials issued may be a certificate or the process may include only the registration of raw public key credentials within a local CR or with an external CA with which the Entity A may have trust relationship. The trust relationship may also be a transitive trust relationship based on an SP's trust relationship with a CR/CA. Raw Public Key credentials that have been issued to Entity A may be used by Entity A to vouch for source authentication (more appropriately message source authentication) and non-repudiation. It may be envisioned that the Step 2, may also be facilitated using the SEF.

Step 3 is Third-Party Credential Requisition Process (TPCRP): Distributing of credentials to authorized entities would include third-party entities performing a credential requisition or an implicit credential provisioning process. Determining the entities that are authorized to receive E2E credentials of an Entity may be determined based on an Access control policy that may be based on an access control list, attribute-based access control, role-based access control or dynamic authorization mechanisms. The authorization mechanisms are out of scope of this document. An Entity, e.g., Entity N, may also be provisioned with the public credentials that were setup by Entity A, in order that a security association may be established between Entity N and Entity A, so that Entity N can access the services offered by Entity A and vice versa in a secure manner. Entity N may use the public key credentials for authenticating messages originating from Entity A.

Step 4a is End-to-End Authentication Process (E2EAP): Following the SESC, SCRP and the TPCRP steps, Entity N performs an E2E authentication of Entity A's messages in this step based on the credentials that were obtained by Entity N during the TPCRP.

Step 4b is E2EAP using delegated mode: In an alternate scheme, Entity N, may delegate the authentication process to a trusted third entity (e.g., a DE) in order to authenticate the messages originating from Entity A on its behalf.

Service Enablement and Security Configuration (SESC) Process

During this process the SEF determines the appropriate security requirements and features that would suit the services and resources offered or requested by an entity. Security requirements and features may be determined using some inference process or explicitly provided by the entity or configured by an administrator who may be setting up the system. The entity may be an authenticator or an authenticatee, and based on the roles, appropriate security features may be determined. The inference on security requirements may be determined using the information provided by the Entity such as Device Type/Capability and Type of Service/Resource Offered. Device Type/Capability may include: Processing Power; Memory; Power consumption; and/or Wireless Radio technology being used (e.g., bandwidth limitations). Type of Service/Resource Offered may be related to Security Requirements and the security rating, and include: Integrity of Data (e.g., High); Message originator Authentication (e.g., High); Non-repudiation (e.g., High); and/or Confidentiality (e.g., Low).

Figure 8:
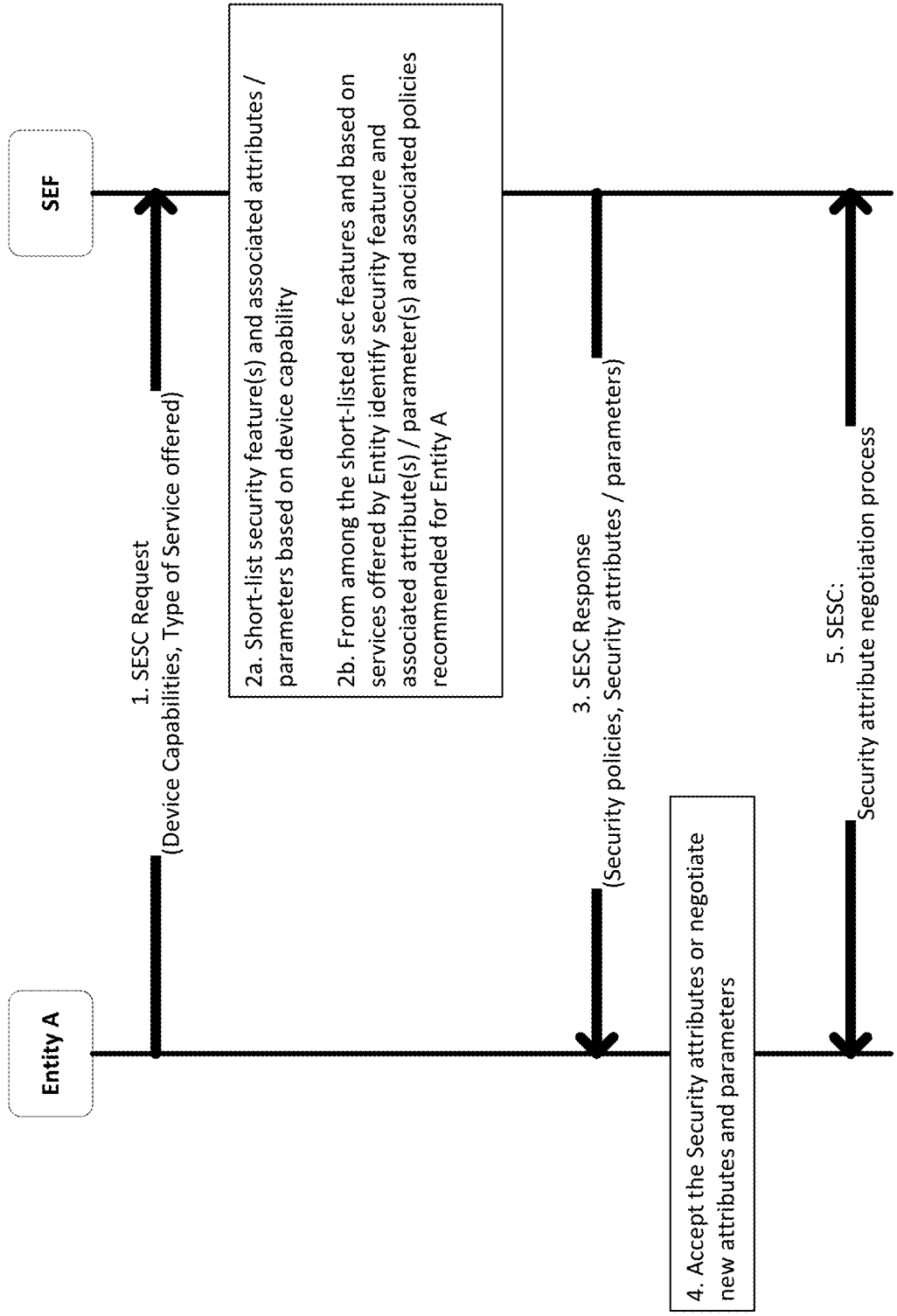
FIG. 8 illustrates example Service Enablement and Security Configuration (SESC) request/response messaging.

FIG. 8 illustrates an example call flow of the SESC Request/Response messaging. In message 1, Entity A requests SESC process to be initiated with the SEF. As part of the message, Entity A provides its device type, unique Device ID (DID) or capability or both and also provides a list of services/application the entity provides.

In step 2, the SEF on receiving the request makes a determination of a list of security features/attribute(s) and associated parameter(s) that may be appropriate for Entity A based on its capabilities. Then, based on the type of service/application the Entity A provides, the SEF may select a narrow list of security features and associated attributes and parameters. In addition, policies on how the features may be used, lifetime associated with the attributes, etc., may also be determined by the SEF. Alternatively, the SEF may create a priority list of features that may be used by Entity A.

Message 3 is a response from the SEF that includes the security features and associated attribute and parameter along with policies. The SEF may also indicate the following flags and/or data: avoidance of HbH security (e.g., only use E2E security); and whether SEF also performs CR functionality; and location or URI of a CR.

In step 4, Entity A may optionally reject the security policies and/or attributes and associated parameters.

In message 5, entity A may enter into a security attribute(s) negotiation process till the attributes and corresponding parameters are agreed upon (optional step).

Selection of appropriate security features and associated attribute/parameter may be based primarily on the capability of the device and secondarily on the type of service offered by the entity. As an example, a low-powered, low-memory device that only provides a service that requires "low" security function(s), the algorithms selected and the key sizes that may be the one that uses a low memory footprint and does not drain the battery resources by selecting less computationally intensive operations. E.g., for an entity with limited capabilities, the digital signature selected may be 256 bytes with 2048 bit keys whereas an entity with more processing and memory and requiring a higher assurance for message authentication, could be provisioned with 4096 bit keys that may be used with SHA-256 mechanism (a more secure algorithm).

Alternatively, the Entity may provide a list of explicit security requirements and send it to the SEF for approval and configuration. Alternatively, the SESC process may be skipped if it is pre-configured with the appropriate security attributes and parameters. Table 2 Example list of security requirements:

TABLE 2

Example Security Parameters

| Parameters | Example Values |
| --- | --- |
| Message Authentication and/or Integrity of signaling/control messages: | Algorithms supported: SHA2 (preferred), Key lengths: 1024/2048/4096 |
| Data confidentiality | Algorithms supported: AES, DES . . . , Key lengths: 128/256/512 . . . |
| Integrity of Data | Required |
| Authentication mechanisms: | Symmetric key, Certificates, Raw Public Key, and/or Bootstrapping Process |
| Capability of supporting Un-Authenticated users | Required |
| Supported protocols | EAP/IPSec/(D)TLS/JWT/JWS |
| Authentication | Direct, Delegated, and or Partial delegated approach |

Alternatively, an end entity, Entity N, may be able to request M2M SP or more specifically a SEF, to include E2E credentials for messages originating from an Entity A.

At the end of the SESC process, the SEF has a complete profile and the capabilities of the Entity. Having knowledge of the capabilities of the Entity, helps the SEF in determining the appropriate security measures that must be implemented in order to protect the workings of the Entity. The SEF maintains a table of the capabilities of the Entity. Table 3 is an example of the kind maintained at the SEF.

TABLE 3

Supported Security Feature and Functions for each Entity

| | | Value/Parameters | | |
| --- | --- | --- | --- | --- |
| Entity ID | Security Features | Algorithms/Protocols | Key Sizes | Misc. Info |
| Entity A | Hashing algorithm | SHA-1 | 160 | |
| | Authentication Mechanism | Certificate | 2048 | |
| | Supported Protocols | TLS, JWS | | |
| | Un-Authenticated use | | | NO |
| | Authentication Process | Direct | | |
| | E2E Authentication Requirement | | | NO |
| | Presence of Secure Element | | | YES |
| | Integrity of Data | | | YES |
| | Replay Protection | | | YES |
| | Delegated/Delegated Auth | | | Direct |
| Entity B | Hashing Algorithm | SHA-512 | 512 | |
| | Data Confidentiality in transit | | | NO |
| | Authentication mechanism | Raw Public Keys | 4096 | |
| | Supported Protocols | Digital Signature (DSS), TLS | | |
| | E2E Authentication Requirement | | | YES |
| | Authentication Process | Delegated | | |
| | Replay Protection | | | YES |

Table 3 illustrates an example list of Entities (Entity A and B) that have been assigned with the type of security features and type of credentials that are to be used. For each security feature there may be associated value(s)/parameter(s), which may indicate the protocol/algorithm to be used, associated key/credential sizes and miscellaneous information. Since Entity B has been assigned to be setup with stronger cryptographic algorithms/protocols, Entity B may be providing more critical messaging and/or information and possibly having more computing resources. Entity B also has the capability to be authenticated using E2E means.

The SEF may also provide services and indications of the same to an entity, such as: an indication of whether the SEF performs CR functionality; the location or URI of a CR, in case the SEF does not provide CR functionality; an indication of whether HbH security may be avoided in order to save resources and only E2E authentication may be used Delegated Vs. Direct Security Mechanisms Public Key based authentication mechanisms may incur higher computing costs and therefore may not be suitable for certain devices that have lower computing resources (memory, processing). In such circumstances, the authentication or verification of authentication may be delegated to a trusted entity (e.g., DE).

For systems that require a high-degree of assurance about the authenticity of an entity or a resource, delegation may be avoided and instead "direct" mechanism may be used. In direct mechanism, the Entity is provided with public key credentials, which may be used by that entity either to create a digital signature or to verify a digital signature. If an Entity is capable of performing E2E authentication and other secure operations on its own, the Entity may opt for performing a direct authentication on its own without the need for delegation. The SEF may select the option for delegation on-behalf of the Entity on its own based on device capabilities or service requirements (e.g., reduce signaling or other operational overhead) offered or used by the Entity. A hybrid approach may also be employed. This is when part of the security functions are delegated whereas other security functions are performed directly. It may be possible for the Entity to perform encryption/decryption with an End entity, whereas End-to-End authentications are performed on its behalf by the SEF or vice-versa.

Security Credential Requisition/Registration Process (SCRP)

The SCRP process may involve a Security Credential Requisition Process initiated by the Entity or by the SEF on behalf of the Entity. Based on the capability and/or the type of service offered or requested by the Entity, appropriate Security Credentials and additionally, other configuration parameters are requested from a Credential Registry (CR) preferably hosted on a Trusted Third-party. It is highly recommended that an authentication between the entity and the CR is carried out before the SCRP request is processed but in some cases, where the entity may not have any credentials and if the entity and the CR belong within the same trusted domain, then the authentication may be optional. Alternatively, the CR functionality may be hosted on the SEF, however, from a scalability perspective, the CR functionality may be performed by a different entity such as a TTP. The CR may generate public key credentials and provides scope of how the credentials may be used, and recommended algorithm(s) to be used etc. The CR then forwards the generated credentials to the Entity directly or optionally via the SEF. The credentials generated by the CR may be, for example, a Public Key Certificate (e.g., X.509 certificate) or Raw Public Keys (with no certificate).

Figure 9:
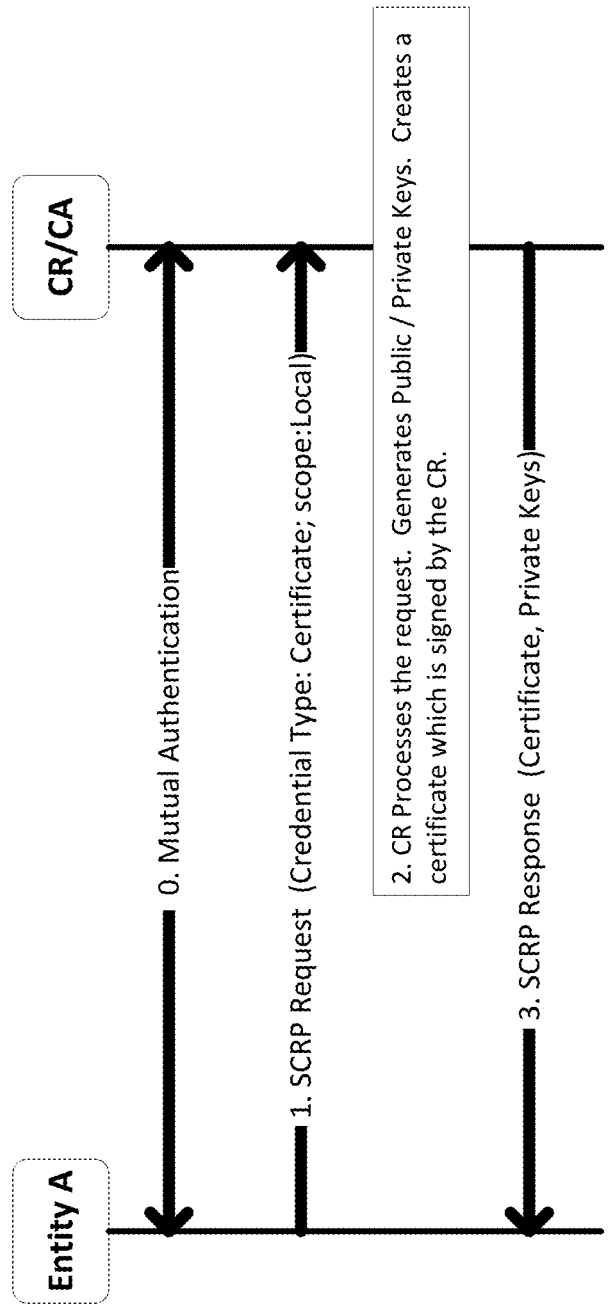
FIG. 9 illustrates an example high-level credential requisition process.

FIG. 9 illustrates a SCRP process, wherein an Entity A requests for security credentials with a CR/CA. In step 0, mutual Authentication may be carried out via messaging between Entity A and CR/CA. In some cases, the authentication may be optional, especially in the case, where the Entity A does not have any credentials and/or if the CR/CA is located within the same security domain. In all other cases, the authentication step may be mandatory. Irrespective of whether an authentication occurs or not a secure connection that is protected for integrity and confidentiality may be established.

In message 1, Entity A requests a certificate having a local scope and the request is made through a secure tunnel that was established in step 1. The type and scope of the credential may be based on the SESC process that may have been carried out earlier. Alternatively, Entity A may request for raw Public Keys without the need for a certificate.

In step 2, the CR processes the request and generates public/private key pairs. Since it is of local scope it may create a certificate, that is assigned to Entity A's identity, along with the public key and signs the certificate using the CR's private key. In case, the scope was global, the CR may send the public key to CA and request for the issuance of a certificate, where the CA generates, signs the certificate and sends it to the CR. The CA is assumed to have a more global scope than the CR.

In message 3, the CR sends the certificate as well as the private key to Entity A in a secure manner.

The private keys are provisioned to the Entity in a secure manner and may use another channel, which is outside the scope of this document. It may be envisioned that certain format is used for delivery of the credentials. Public Key Cryptographic Standards (PKCS) protocols may be used for request and provisioning process. Alternatively, public key credentials may be transported from the CR to the Entity using e.g., JSON Web Key (JWK) structure. The Entity may request the format in which the credentials are to be distributed or it may be negotiated using SCRP Request/Response messages before credentials are provisioned to the Entity by the CR.

Alternatively, in a Security Credential Registration Process, an Entity may generate credentials (Public/Private Key pair) and then request that the credentials be registered with the CR. As a result of the registration process, the private keys that are associated with the Entity remain on the Entity, however, the public key is sent by the Entity in order to be registered with the CR using public key cryptographic standards (e.g., PKCS). Also, included as part of the credential request is an associated unique identity associated with the Entity. The registration process may involve multiple round-trip messages. At the end of the process either a certificate is generated and provisioned to the Entity or the raw public key is registered within the registry and associated with the unique ID associated with the Entity A.

TABLE 4

Security Credentials associated with each Entity/Context

| Entity ID | Certificate | Public Key(s) | Key Size (bits) | Scope/Algorithm | Valid (secs) | Auth Parameters |
|---|---|---|---|---|---|---|
| Entity A-Context 1 | Entity A - Public Key | 34B2342E . . . | 2048 | Encryption: RSA Signature: using SHA-1 | 259,200 | N/A |
| Entity B-Context 1 | Entity B - Content 1-Certificate | Link to a certificate | 2048 | Encryption: RSA | 259,200 | N/A |
| Entity B-Context 2 | Entity B - Context 2-Public Key | 8927B435D234DC42342 . . . | 4096 | Encryption: RSA | 259,200 | N/A |

An Entity (e.g., application or device or server) may request one or more credentials or register one or more credentials with a CR. The entity may use the credentials for various contexts. Context can be defined by the entity based on how the credentials are intended to be used. A context may be unique within the Entity and when associated with the Entity, it must be unique within the domain of the CR. Therefore no two contexts can have the same identity and therefore the same public key. When an Entity registers their credentials with the CR, the CR must make sure that the contexts within an Entity are uniquely identifiable and if there are uniquely identifiable Entities within the domain of the CR, then the public key credentials are unique and may be successfully registered within the CR.

In the case, where an Entity requests for Credentials, the Entity ID (e.g., URI), ContextID, associated keys and other associated parameters and "Scope" may be provided to the requesting Entity. "Scope", may provide details about the type of cryptographic process. Scope may include, the type of algorithm(s) being used, parameters that may be used, the "header" information (message origin information details) that are to be used for derivation of a DS/MAC, information on whether freshness information has to be used etc. Scope may also include what type of messages may be authenticated. E.g., "Notify" message may be deemed to be non-critical for an application and may choose not to provide authentication tag to all Notify messages, whereas all "update" messages may be provided with an authentication tag. SEF may be able to tailor the scope of E2E authentication based on the capability and type of service offered by Entity A. Alternatively, a request containing the Entity ID and optionally a ContextID may be sent by the Entity to the CR. The authentication parameters may indicate the security information that may be included as part of the security process (e.g., authentication process). Each security context that is established has a valid lifetime, after which the context may be updated or a new one created.

An example representation of keys provisioned to Entity 2 using the JavaScript Object Notation (JSON) is shown in FIG. 10.

Third-Party Credential Requisition (TPCR) Process

In this step, an Entity N that is required to perform an End-to-End authentication of another Entity (e.g., Entity A or Entity B), may request a Certificate or public keying material, scope associated with the keys, parameters that may be used for demonstrating message authentication and other information so that an E2E authentication may be carried out. The requesting Entity N may be mutually authenticated with the CR before the public key credentials of Entity A (certificate(s) or raw public keys) are released to Entity N. In certain instances, the authentication of the Entity N be skipped. In addition to authentication of Entity N, by the CR, the CR may check to verify if Entity N has been authorized to obtain the credentials associated with Entity A. If Entity N is successfully authenticated and has been deemed to be authorized, then Entity N is provisioned with Entity A's credentials, Context ID/URI, Port #, associated Key(s), scope and associated parameters.

Figure 11:
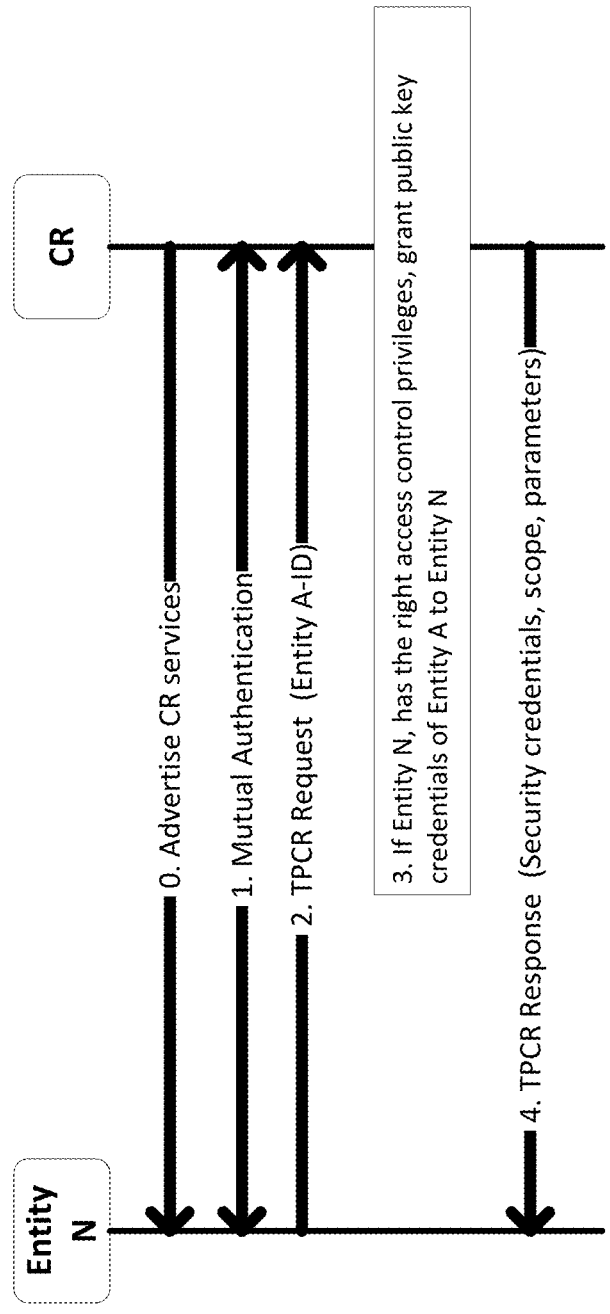
FIG. 11 illustrates an example Third-Party Credential Requisition (TPCR) process flow.
Figure 12:
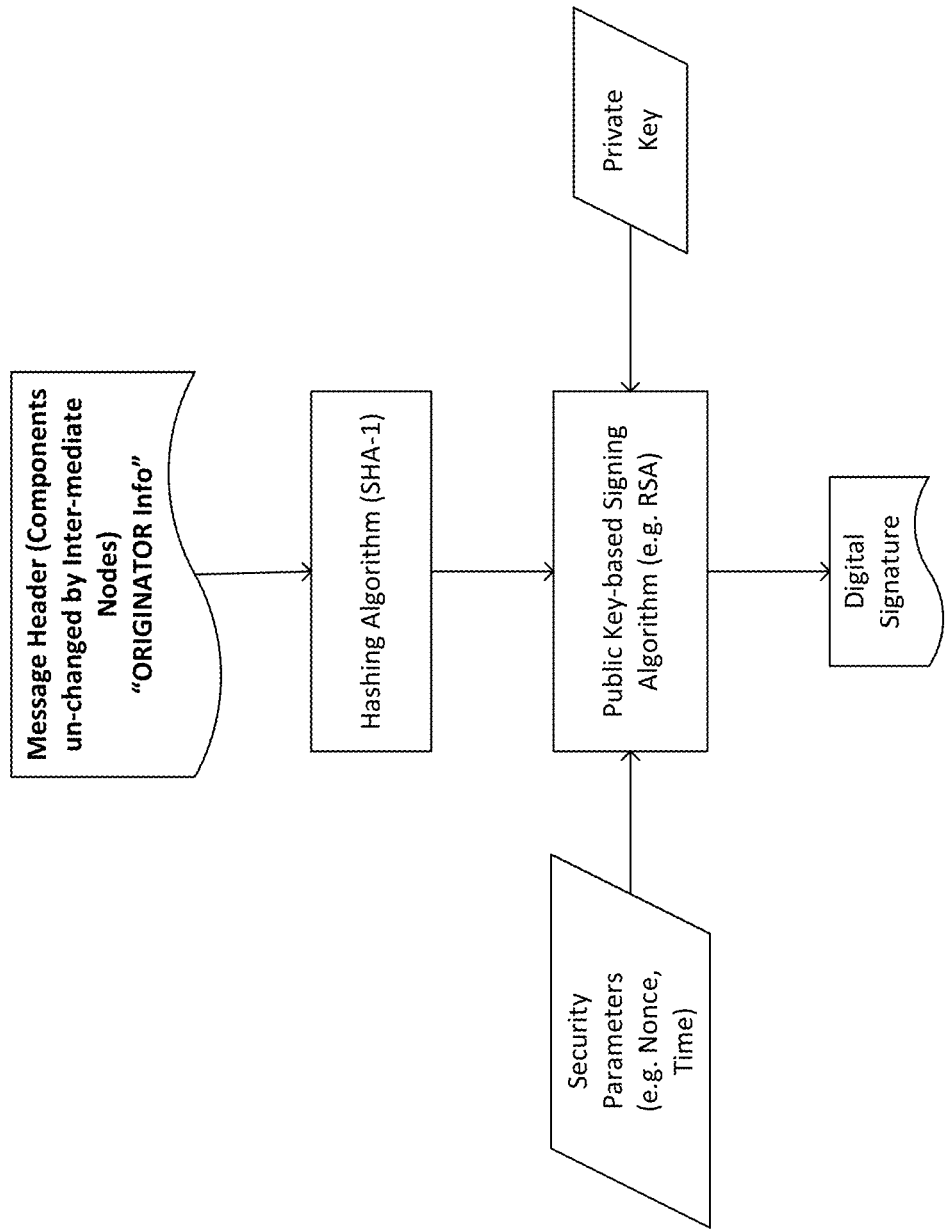
FIG. 12 is a flow-chart showing an example high-level mechanism for creating a digital signature.

FIG. 11 depicts a call flow depicting the TPCR process. In message 0, a CR advertises credential requisition services to entities.

In step 1, Entity N and the CR perform a mutual authentication. This step may be optional if there is a trust relationship between Entity N and the CR.

In message 2, Entity N sends a TPCR requesting Entity A's credentials by including Entity A's ID (e.g., Entity A's URI) in order to obtain Entity A's E2E public key credentials, parameters, scope, etc.

In step 3, the CR may perform access control checks to see if Entity N is indeed authorized to obtain Entity A's public credentials.

In message 4, the CR sends Entity A's public key credentials (e.g., certificate, raw public key) and the associated scope as well as the required parameters to the Entity N.

At Entity N, it may maintain the following parameters with regards to the Entities (e.g., Entity A) that it would like to create and maintain security associations with after the completion of the TPCR process:

The authentication protocol information may indicate the choice of protocols where the credentials may be used. This may be optional. E.g., Public key credentials may not be used for encryption purposes for Entities that may have limited computing or memory resources.

The credential information may include the type as well as the actual credential (e.g., public key or an entire certificate)

The protocol information may be specific protocols that may or must be used, such as TLS, DTLS, IPSec, or EAP, for example. The protocol information may also include information about the type of verification that may be used e.g., using digital signature, MAC or JWS.

The validity information may pertain to each credential. For example, each credential may be associated with a lifetime that is represented either by number of days it is valid or the date when the credentials may expire.

Parameters may include values that may be used to provide proof of key possession/message authentication. E2E authentication at the service layer, wherein hop-by-hop protection mechanisms may still be used, may additionally incorporate an E2E digital signature. Additionally, information and parameters that are considered to be confidential in nature may be protected at the service layer. Message integrity protection and/or message authentication may be provided by means of a JSON Web Signature (JWS). Only the meta-data may be processed by intermediate nodes. The meta-data may be integrity protected and authenticated by an E2E JSON web signature created using the private key associated with the public key. Alternatively, the entire

TABLE 5

Authentication Mechanism, Scope and parameters to be used with each Entity

| Entity ID | Context ID | Type of Auth | Port# | Cryptographic Algorithm(s) | Credential (Key/Cert) | Protocol | Validity | Parameters |
|---|---|---|---|---|---|---|---|---|
| Entity A's URI | Signing, Encryption | Hop-by-Hop | 443 | SHA-1 + RSA | 2341234E . . . | Service Layer: TLS/JWS | Dec. $31^{st}$, 2015 | Nonce, Time |
| Entity B's URI | Encryption | End-to-End | 8443 | RSA | 3569424 . . . | Session Layer | Jun. $21^{st}$, 2018 | |
| Entity B's URI | Signing | End-to-End | 8443 | SHA-1 + RSA | 584234A234D234 | DTLS JWS or DS | Sep. $23^{rd}$, 2020 | Random value |

In Table 5, in order for an Entity N to perform an E2E authentication with Entity A, it may be provided with: entity ID; context ID; type of authentication; port number; authentication protocol; credential; protocol; a validity; and various associated parameters.

The entity ID information may refer to an entity that is an application, device, server software program, etc. Anything that can be uniquely identifiable within the service provider domain using a resource identifier may be given an entity ID.

The context ID information may be used to identify the context within an entity in which the credentials may be used. Contexts may be defined but not limited to signing operation (e.g., computing a digital signature) or encryption operation or any other cryptographic operation.

The type of authentication information determines the layer at which Authentications may be carried out. These include authentications that may be carried out at the service, session, network, MAC layer. The Authentication mechanisms at the service and session layers are of interest for the current disclosure;

In case of Session Layer E2E authentication, a port number may be optionally provided.

message that is not modified by any intermediate nodes may be used to create a JSON web signature or Digital Signature (DS). It may also be possible for the signature (DS or JWS) to be generated using other means and represented using proprietary mechanisms. Irrespective of the mechanisms used to generate the signature and representation of the signature within the messaging, the overall message that is not modified/removed by intermediate nodes may be protected against replay attacks by making use of Nonce/Random value that is associated with a time component or a combination of both Time and Nonce. For example, a signature may be derived using a private key, provisioned to the entity requesting E2E authentication by the CR or generated by the Entity and stored locally in a secure manner.

Similarly originator information may be used to authenticate the originator of the message. If the right set of message info is used for creation of a meta-data then it could be used to authenticate not only the E2E authentication of the originator of the message but also the "intention" of the message. Intention of the message may indicate the source (originator) of the message, the destination (receiver) of the message, type of message, type of operation the message may trigger and the resource (e.g., sensor resource) on which the operation (Create, Delete, Update, Retrieve, Notify) is performed. It is assumed that the "Originator Info" has not been modified by any intermediate nodes. Example parameters associated with originator information may include: a "fr" field with the identifier associated with the source/originator of the message; a "to" field indicating the destination of the message; and "op" field indicating the type of operation that is to be carried out, e.g., Create, Retrieve, Update, Delete, or Notify; a "res-ID" field indicating a unique resource or a type of resource; a "session-id" field indicating a unique session. The session ID is may be a number in sequential order or a random value (e.g., a nonce) and may or may not be associated with a time component (e.g., NTP).

The parameters may include security parameters. For example, the security parameters may include one or more random value, a nonce, or a time parameter such a timestamp of when the original message was created. A nonce may be used to associate uniquely with a session. In addition, the security parameters may contain information on how/type of cryptographic suites to be used, credentials to be used etc.

The security parameters may include an indication of the Session Layer: An E2E authentication by means of DTLS or TLS is used. This would by-pass Hop-by-Hop security mechanisms. The end Entities would be mutually authenticated and security association is established. This may be done between Entities in a truly E2E manner (Direct) or Delegated modes. The E2E public keys may be used to authenticate between the two end-points using the Application layer protocol such HTTPS/CoAPS.

End-to-End Authentication Process (E2EAP)

The E2E Authentication process may be performed in a direct E2E manner or in a delegated or partially delegated (hybrid) manner. The E2E authentication may not involve mutual E2E authentication and may only entail a one-way authentication in an E2E manner. In lot of cases, the E2E authentication may only involve an Entity N (authenticator) authenticating another entity, Entity A (authenticatee) and not vice-versa. Depending upon the use cases and SESC process, it may be determined that an E2E mutual authentication may be required. The mechanisms described in the document can be used to perform both mutual E2E authentication as well as one-way E2E authentication. In such a case, Entity A behaves as both an Authenticatee as well as an Authenticator, similarly Entity N performs the role of an authenticatee as well as an authenticator. In such a scenario, it is assumed that Entity N, may have performed the SESC and SCRP process beforehand and the Entity A has performed the TPCR process. In order to explain the concept of E2E authentication, in this document, only one-way authentication is described in detail since similar processes may be carried out for performing mutual authentication. For rest of the document, the term E2E authentication would mean either authentication of the originator of the message, and/or intention of the message or authentication of the entire message.

Based on the scope that was provided or selected by the Entity, the E2E authentication process may be carried out by verifying the DS or JWS. For example, a certificate-based mechanism may be used whereby credentials that are provisioned may be based on Public Keys represented in the form of certificates and used only by authorized entities for the context that is applicable. An entity wishing to establish E2E security association may use the certificate for authentication and message authentication based on the public key associated with the certificate. The certificate may be pre-provisioned or obtained during an E2E authentication process with CR (during TPCR phase). Alternatively, public keys may be registered by an Entity with another entity and associated with a particular context. An entity may be challenged using a random handle (nonce) in order to verify the possession of a private key. In some cases, a challenge may be optional, but freshness information may be provided by the originator of the message and the signature by using a generated unique random handle/nonce.

An Entity that performs E2E authentication of a message originating from another entity, may obtain the appropriate E2E credentials during the TPCR phase. In addition the entity may also obtain other relevant information such as scope. As part of the authentication process, the Entity may check to see based on the scope information, what types of messages are expected to be protected with an authentication tag. When a message is received, the Entity checks to see the scope information associated with that resource and obtains the appropriate credentials that may have been locally stored during the TPCR process or obtains it explicitly from a TTP. Based on the scope information and the credentials and the message origin information or message intention (e.g., metadata) of the original message, the Entity computes a DS or Auth-tag. It compares the Auth-tag with the Auth-Tag that was sent as part of the message and if there is any discrepancy the message may be discarded.

Figure 13:
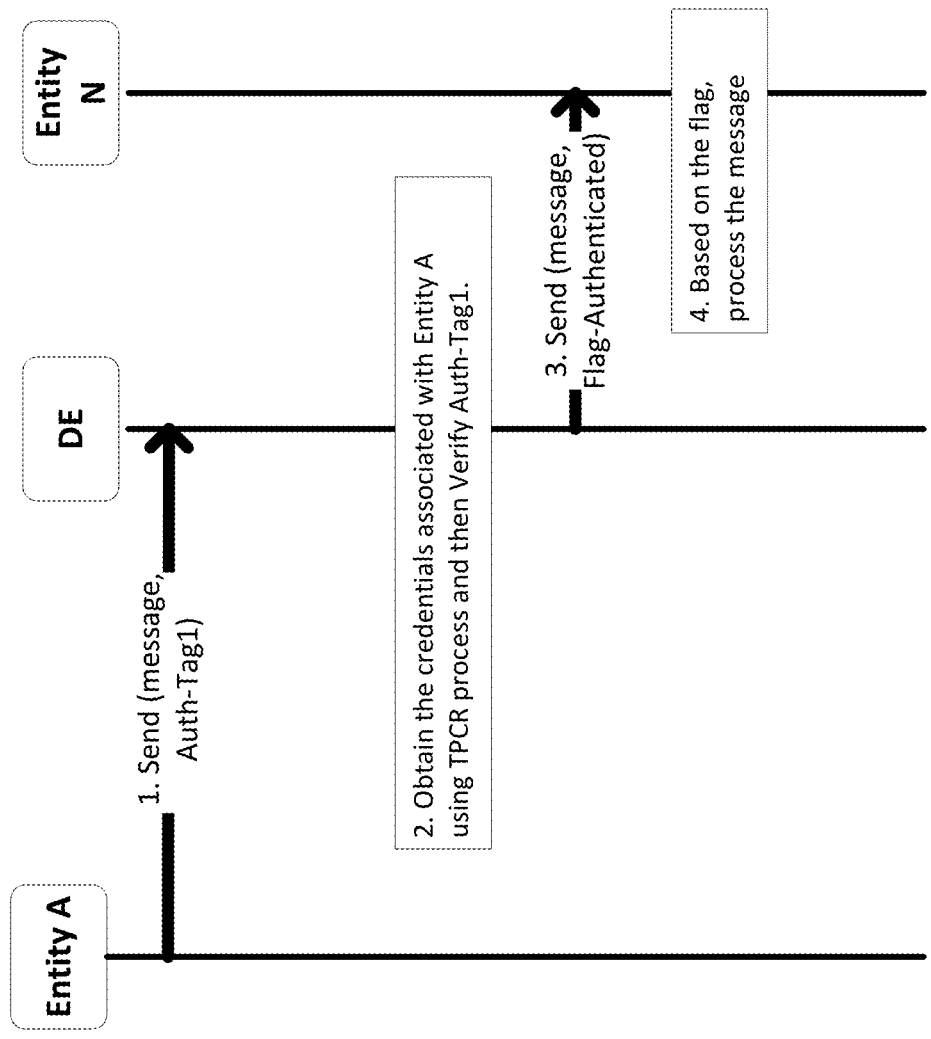
FIG. 13 illustrates an example one-way E2E authentication process by means of a Delegated Entity (DE.)

FIG. 13 is an example call flow depicting a one-way authentication of an Entity A's message by a DE on behalf of Entity N. Entity A sends a message 1 that also contains an Auth-Tag1 (e.g., DS or MAC). The message may contain an optional flag1 indicating that the message has an Auth-Tag, which can be used for message originator authentication purpose.

In step 2, a DE that has been authorized by Entity N to perform message authentication on Entity N's behalf may obtain Entity A's public key credentials using implicit mechanisms or explicitly by performing a TPCR process. The DE then verifies the Auth-Tag1. The DE may decide to perform authentication based on flag1. In a non-delegated mode, the Entity N, verifies the Auth-Tag1 on its own and Message 3 is skipped.

The DE forwards the message to 3 Entity N. Message 3 may include a flag2 indicating if the message originator has been successfully authenticated from E2E perspective.

In step 4, Entity N verifies the flag and, based on the flag, processes the message.

EXAMPLE EMBODIMENTS

Figure 14:
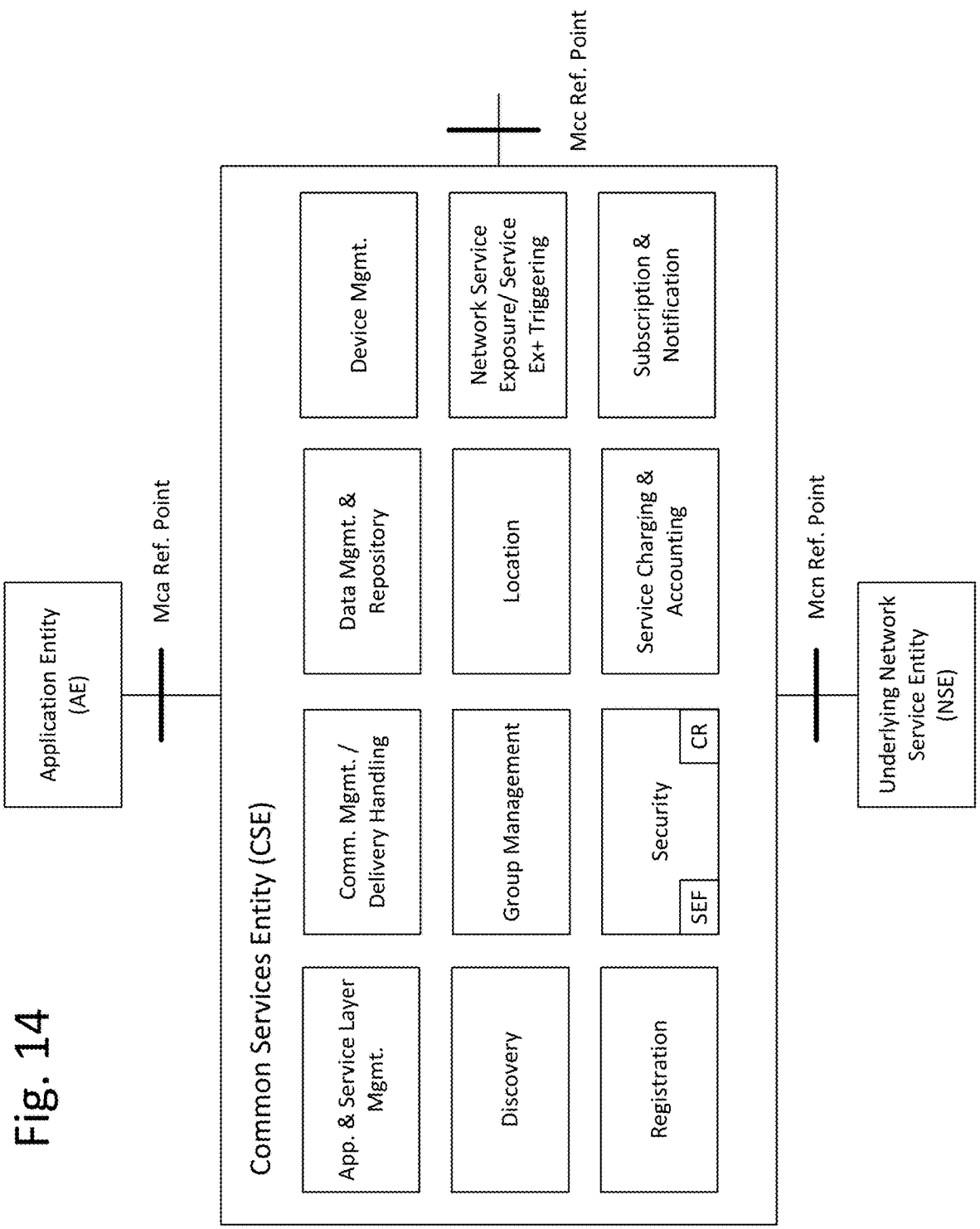
FIG. 14 illustrates an example security Common Services Function/CSE incorporating Service Enablement Function (SEF) and Credential Registry (CR) functionalities.

The embodiments described here are mainly focused on the oneM2M architecture. The general functions described earlier (e.g., SEF, CR) may be incorporated into the oneM2M architecture as part of the "Security" CSF and is depicted in FIG. 14.

As described in the previous sections, the E2E authentication process may entail 4 steps. In certain implementations/embodiments, the steps may be combined or optimized based on the entities involved and their trust relationships between the entities and the protocols employed. A high-level description of the solution using the service layer (e.g., oneM2M) is described below:

Service Enablement and Security Configuration (SESC)

The SESC function may be hosted on the Common Services Entity (CSE).

The SESC may be carried out between the Application Entity and the CSE prior to the oneM2M registration process. The SESC function may optionally be hosted on an Entity that resides within the Service Provider domain and in that case, the AE performs the SESC process with the entity hosted on the M2M Service Provider (SP) network. One can envision that the SESC process may be carried out by a TTP. As a result of the regular oneM2M registration process, appropriate Credentials for hop-by-hop security may be provisioned to the AE and CSE. As part of the SESC process, identification of appropriate credentials, scope and parameters is carried out. The E2E Credential Provisioning and Registration process may be carried out during the SESC process as well if the Registrar CSE is also performing the SESC function.

Figure 15:
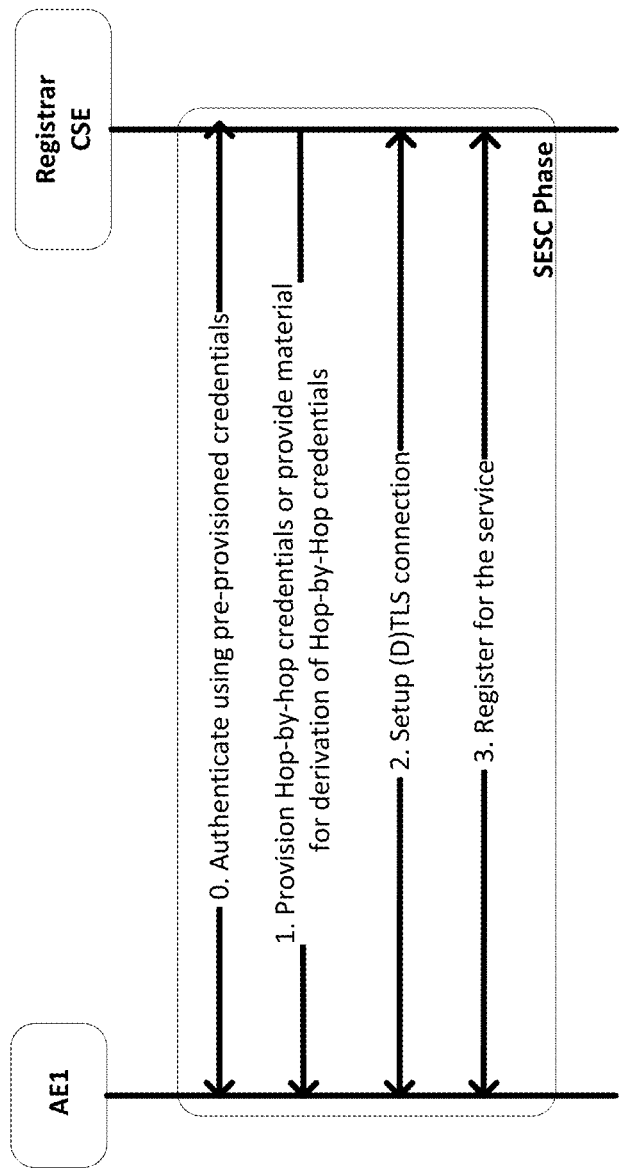
FIG. 15 illustrates an example of registering with a CSE wherein a Service Enablement and Security Configuration (SESC) function resides at the Registrar CSE (RCSE.)

FIG. 15 illustrates an example of registering with a CSE wherein a Service Enablement and Security Configuration (SESC) function resides at the Registrar CSE (RCSE.) In step 0 an AE1 is provisioned with credentials that may be configured in order that it can be paired-up and then registered with a Registrar CSE (RCSE), which follows mechanisms described in the current oneM2M specs. The configuration of the AE1 may be performed by means of putting e.g., a shared secret of the RCSE into AE by means of GUI, web interface or interface from a console. Any number of AEs may initially share the same secret with the RCSE. Or a one-time password may be used to pair the RCSE and the AE. Alternatively, an AE certificate may be used in order to authenticate with the RCSE and vice-versa by means of certificate or public key.

In step 1 a unique hop-by-hop (HbH) credential is then either derived and provisioned to the AE1 by the RCSE or keying material is provided to the AE1 by the CSE in order that hop-by-hop credentials are provisioned. Only AE1 and RCSE shares the newly provisioned credential. Based on the type of service offered by the AE, appropriate credentials may be provisioned to the AE (based on the criteria discussed in Section 5.1), along with the appropriate context and parameters that may be used with the credentials. It may be possible that during this step, that there is a negotiation process in order to generate or derive credentials that are acceptable by both the entities (RCSE as well as the AE1) and may therefore entail more than one message going in either directions between the RCSE and AE1 till the two entities have agreed on the selected credentials. It may be possible that the RCSE also provisions the E2E credentials at this phase based on the requirements provided by the AE1. Alternatively, the E2E public key credentials may be provisioned at the SCRP phase or alternatively, the E2E public key credentials may be provisioned at step 3.

In step 2 the AE1 and the RCSE create a secure DTLS tunnel using the HbH credentials In step 3 the AE1 performs the registration process using the secure tunnel.

Alternatively, the SESC process is carried out by a TTP and provisioning of Hop-by-Hop credentials are provisioned to the AE and to the registrar CSE by the TTP. It may also be possible for the TTP to provision the E2E public key credentials to the AE by the TTP, which may host a CR.

Figure 16:
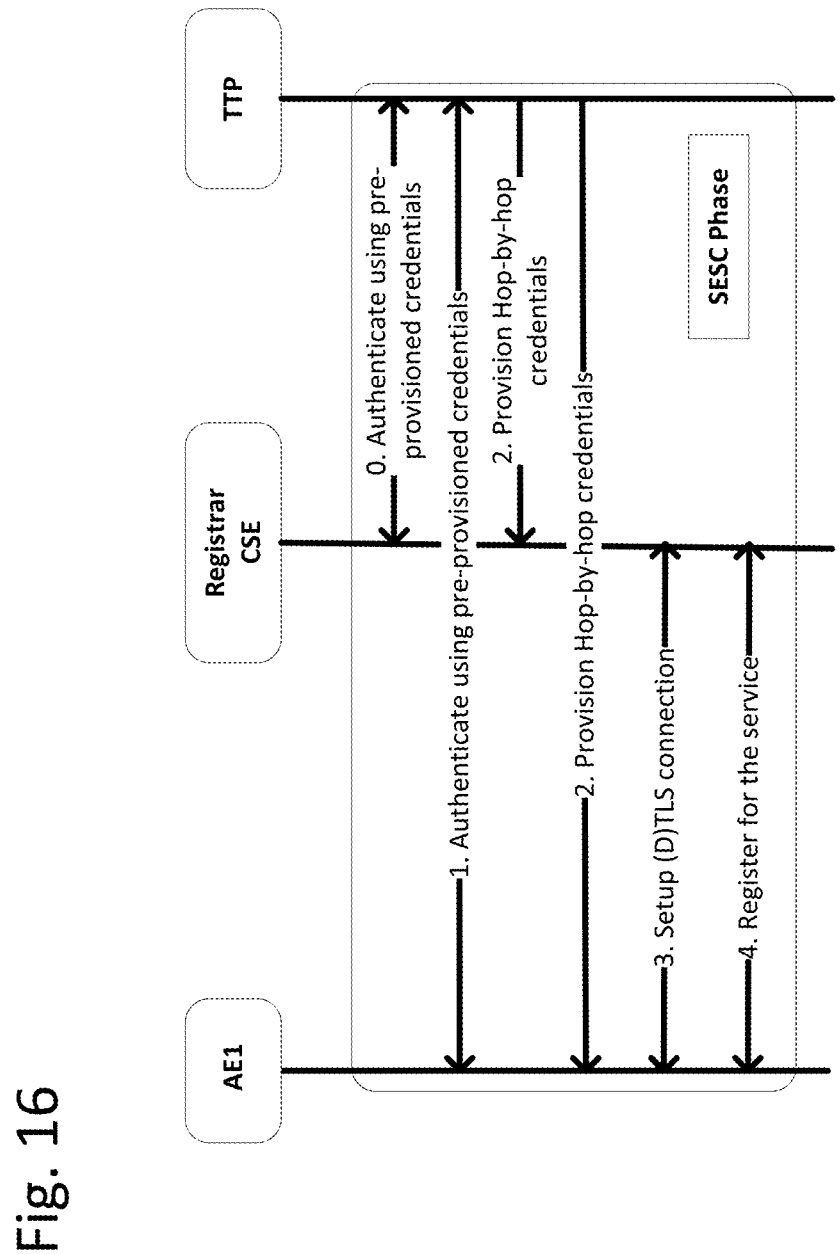
FIG. 16 illustrates an example where hop-by-hop credentials are provisioned by a Trusted Third Party (TTP.)

FIG. 16 illustrates an example where hop-by-hop credentials are provisioned by a Trusted Third Party (TTP.) In step 0, the RCSE authenticates with a TTP using a pre-provisioned credentials between the RCSE and the TTP. In step 1, AE1 authenticates with the TTP based on a pre-provisioned credentials between the AE1 and the CSE.

In. step 2, the TTP provisions the hop-by-hop credentials that are to be shared between the RCSE and AE1 using a secure connection to both the entities. The credentials may have been bootstrapped based on the credentials that were derived based on the authentication between the RCSE and the TTP as well as the authentication between the AE1 and the TTP. E.g., unique hop-by-hop (HbH) credential(s) may then be derived and provisioned to the AE1 by the TTP as well as to RCSE. Only AE1 and RCSE shares the newly provisioned credential(s). Based on the type of service offered by the AE (based on the criteria discussed in Section 5.1), appropriate credentials may be provisioned to the AE1 and the RCSE along with the appropriate context and parameters that may be used with the credentials. It may be possible that the RCSE also provisions the E2E credentials at this phase based on the requirements provided by the AE1. Alternatively, the E2E public key credentials may be provisioned at the SCRP phase.

In step 3, the AE1 and the RCSE create a secure (D)TLS tunnel using the HbH credentials. In step 4, the AE1 performs the registration process using the secure tunnel.

Figure 17:
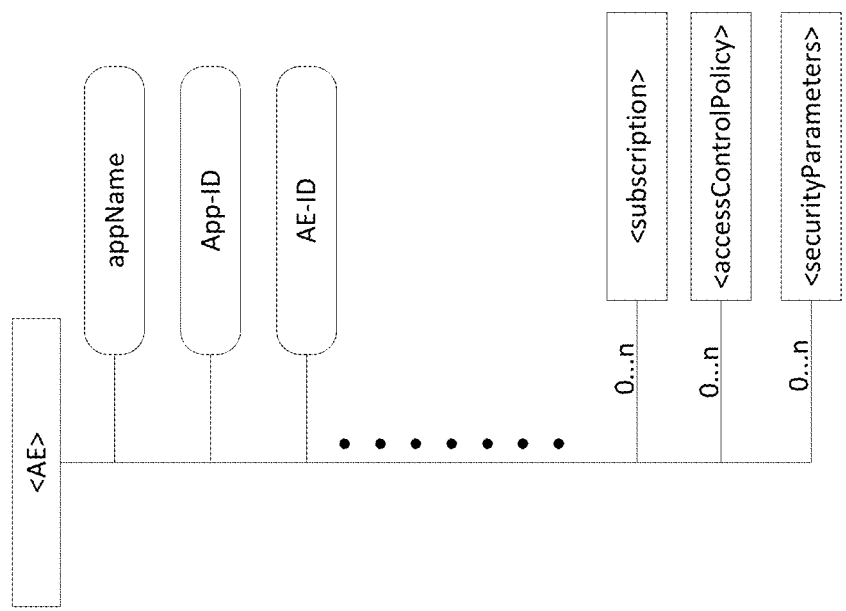
FIG. 17 illustrates an example structure of an AE resource.

FIG. 17 depicts a high-level <AE> resource structure, with resource type "securityParameters" that has been added to the <AE> resource structure based on upon the HbH credentials that has been provisioned. There may be 0-N such "securityParameters" associated with <AE> resource that is applicable to the context in which the security parameters may be used.

Figure 18:
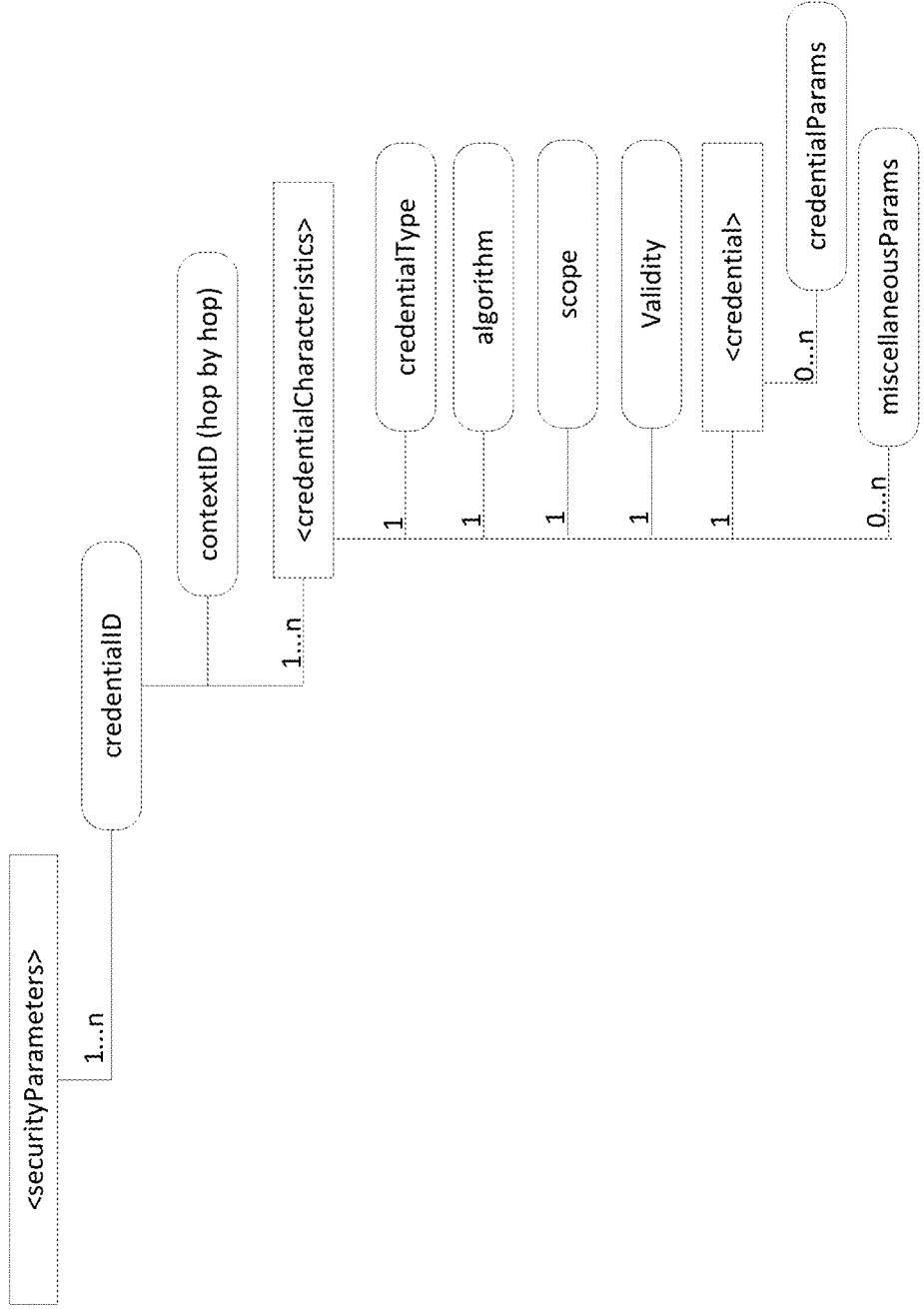
FIG. 18 illustrates an AE resource after a hop-by-hop credential provisioning.

FIG. 18 depicts the AE resource after the HbH credentials have been provisioned. The HbH credentials are identified by credentialID attribute, along with the credentialCharacteristics that may be used to describe the type of credential (e.g., public key or PSK), the algorithm to be used with the credential, scope being for signing or encryption, credential-specific parameter (e.g., keys, public key parameters) and miscellaneousParams that may have components like Nonce/Random value that was used, Time component, meta-data information that is expected to be used etc.

Security Credential Requisition/Registration Process (SCRP)

The SCRP process is primarily focused in requisition and/or registration of public key credentials for End-to-End Authentication. The SCRP process described here focuses primarily with regards to AE's E2E credentials. However, similar processes may be used in order to perform SCRP for a CSE to perform SCRP with a TTP or the CSE's RCSE.

Figure 19:
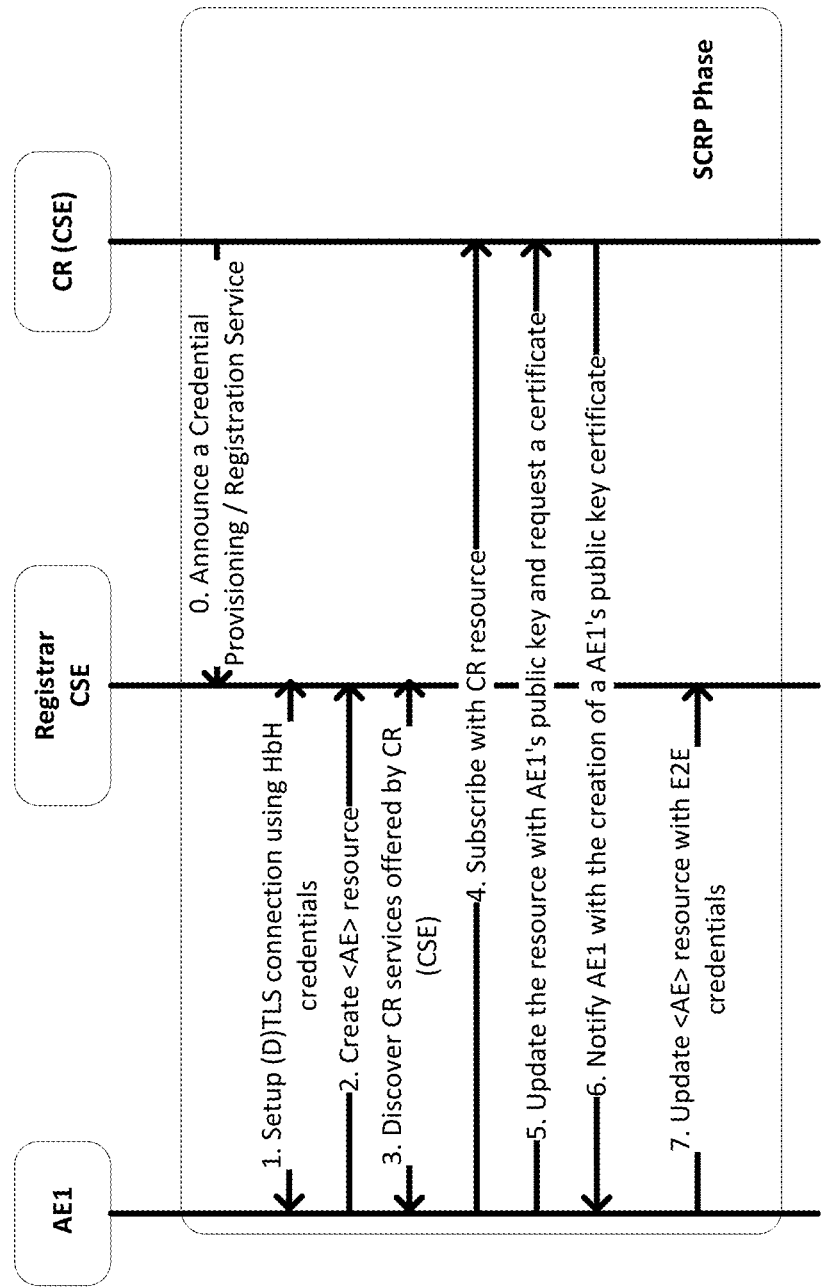
FIG. 19 illustrates an example of an AE requesting E2E public key credentials from a Credential Registry (CR).

FIG. 19 illustrates an example of an AE requesting E2E public key credentials from a Credential Registry (CR). In step 0, a CR may provide credential provisioning service using the oneM2M service layer. The CR may announce <Annc> it's services to the CSEs. The RCSE may optionally subscribe to the service as well. The CR may optionally create a resource at the RCSE, but the resource may only provide information about the CR and reachability (link) to the CR (CSE) and not the complete CR functionality.

In step 1, the AE1 establishes a (D)TLS connection using HbH credentials with the Registrar CSE (RCSE). If an existing (D)TLS connection exists then no new connection is established.

In step 2, AE1 creates an <AE> resource at the RCSE if it does not exist already. The AE1 expects the Resource to be updated at some point once the credentials are provisioned.

In step 3, AE1 discovers services offered by CR by querying the RCSE and obtains information regarding reachability and services offered by CR.

In step 4, AE1 subscribes with CR resource requests the creation of a resource with the CR. This may be a child resource tailored for AE1 and the CR may maintain multiple child resource(s) associated with each AE that had requested a SCRP process. CR provides a list of security parameters to be used by AE1 in order to register/requisition for credentials.

In step 5, AE1 Updates the resource with its public key. The message may optionally be signed using AE1's private key.

In step 6, the CR may verify the signature and after verifying all the required checks may issue a digital certificate. CR may notify the AE1 when the certificate has been created and provision it to AE1.

In step 7, the AE1 may update its resource on the RCSE with the provisioned credentials and parameters. Optionally, the RCSE may update AE1's resource on the RCSE at step 5.

Figure 20:
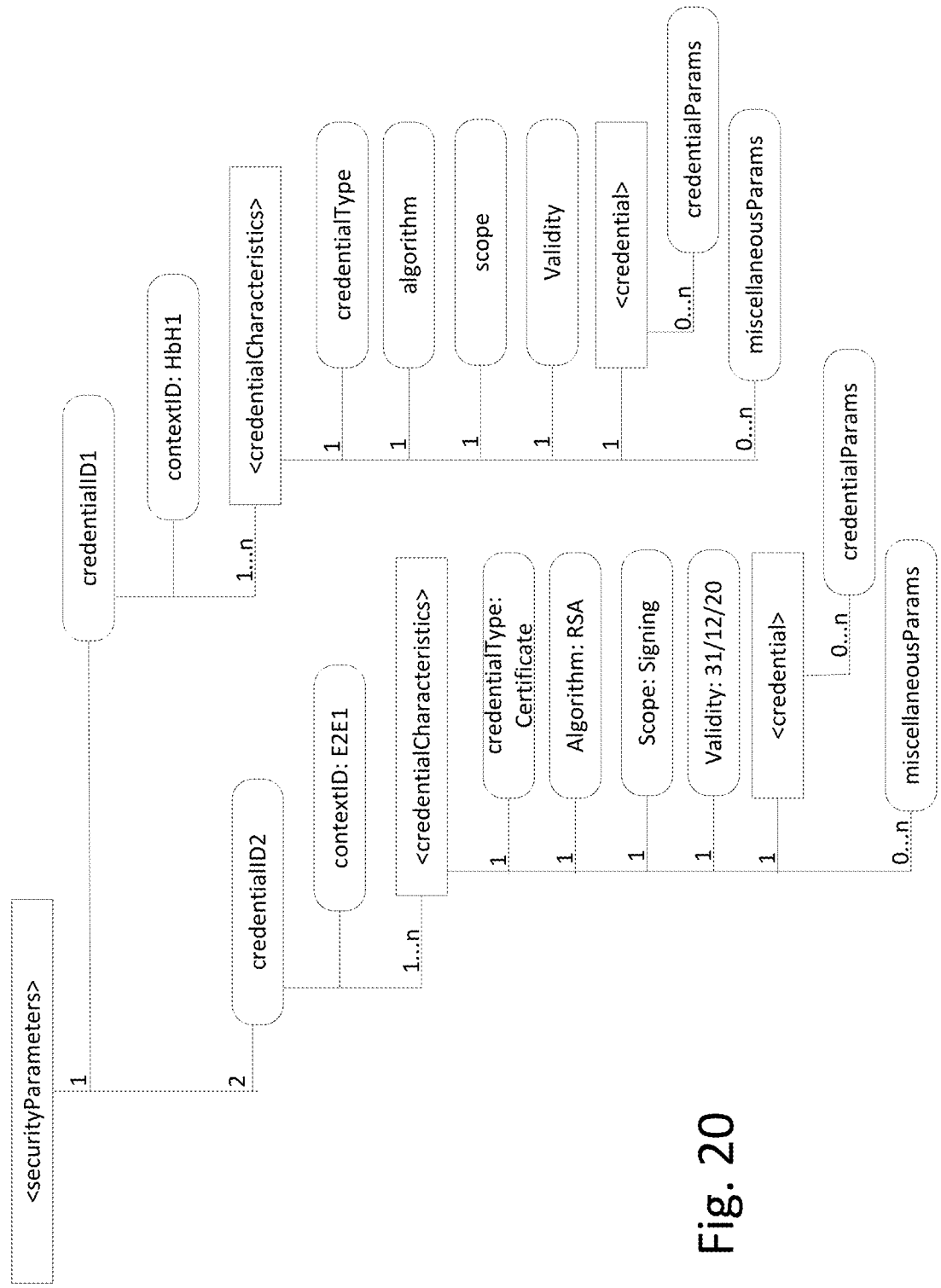
FIG. 20 illustrates an example of an AE resource updated with E2E public key credentials.

Once the AE1 resource has been updated with the security parameters at the RCSE, the resource may take the form depicted in FIG. 20.

Alternatively, the CR functionality may be hosted at the RCSE or HCSE. An AE may be able to request for certificates or for registering public key credentials with the RCSE as illustrated in FIG. 21.

Figure 21:
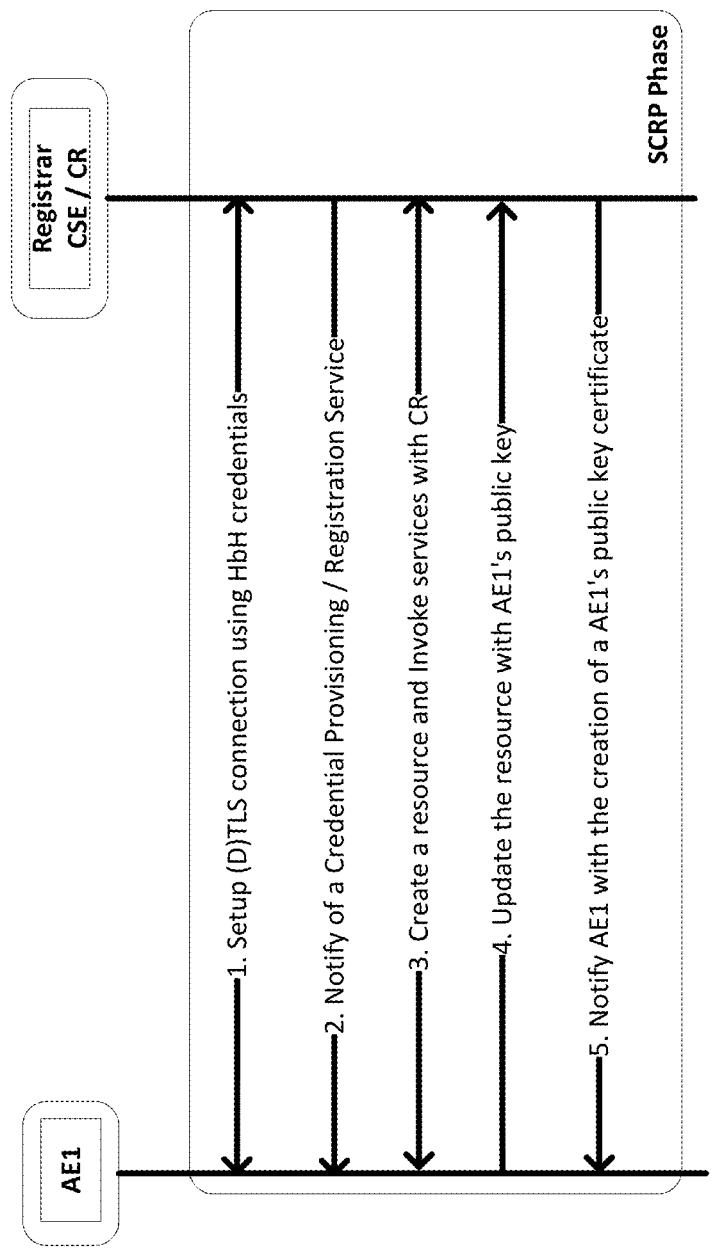
FIG. 21 illustrates an example of an RCSE hosting CR functionality.

In step 1 of FIG. 21, the AE1 establishes a DTLS connection using HbH credentials with RCSE. If an existing DTLS connection exists then no new connection is established.

In step 2, the RCSE may provide credential provisioning service implementing a CR functionality. The RCSE may announce <Annc> it's services to other CSEs. An AE requiring credential requisition services may discover services hosted by the RCSE. AE1 discovers that RCSE provides CR services.

In step 3, AE1 requests the creation of a resource with the CR. This may be a child resource tailored for AE1 and the CR may maintain multiple child resource(s) associated with each AE that had requested a SCRP process. CR provides a list of security parameters to be used by AE1 in order to register/requisition for credentials.

In step 4, AE1 Updates the resource with its public key. The message may be optionally signed using AE1's private key.

In step 5, CR may verify the signature (this may be optional) and after verifying all the required checks may issue a digital certificate. CR may notify the AE1 when the certificate has been created and provision it to AE1.

Third-Party Credential Requisition Process

Credentials may be distributed or provisioned in an implicit manner or explicitly. Credentials may be distributed implicitly as a result of a retrieve process involving a resource, wherein the credentials are attributes of the resource. In the explicit process, the credentials may not be available as attributes of the resource hosted at the RCSE, but the credentials may be hosted on another TTP server (which may be part of the service provider), which an AE wishing to obtain will have to make an explicit request for the credentials.

Figure 22:
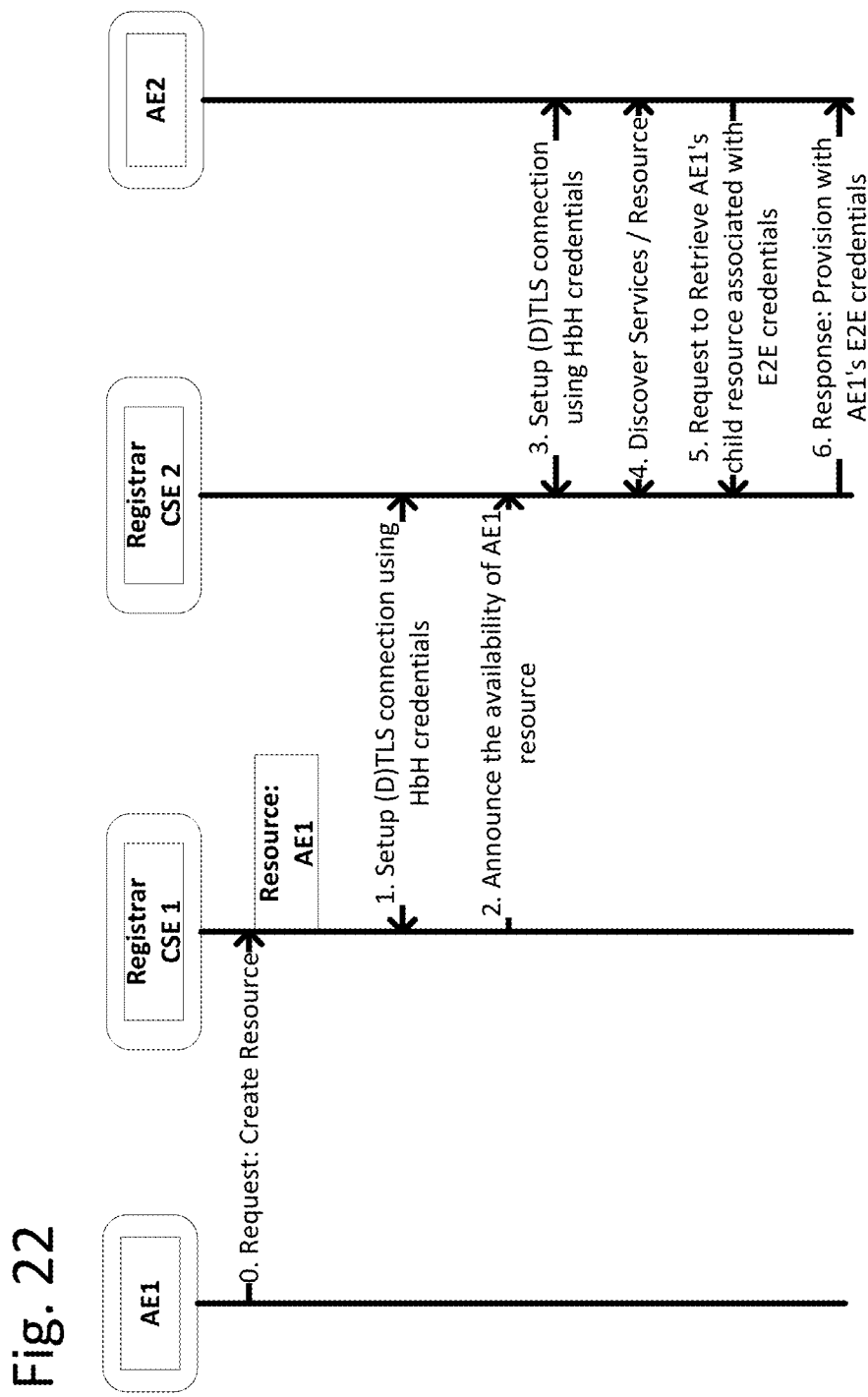
FIG. 22 illustrates an example of credential distribution to third-party using implicit means.

FIG. 22 depicts implicit distribution of credentials to third-parties.

In step 0, AE1 requests creation of resource with its RCSE1. Based on the request, RCSE1 creates a resource.

Based on the request and on an analysis performed during the SESC process, appropriate E2E credentials may be provisioned.

In step 1, RCSE1 sets-up a DTLS connection with RCSE2 using HbH credentials shared by the CSEs (RCSE1 and RCSE2).

In step 2, RCSE1 announces the availability of AE1 resource to RCSE2.

In step 3, An AE2 sets up a secure DTLS connection with RCSE2 using HbH credentials shared between AE2 and RCSE2.

In step 4, AE2 performs a resource discovery operation and obtains information about the Announced resource AE1.

In step 5, AE2 requests to retrieve AE1 child resource associated with AE1's E2E credentials.

In step 6, After performing relevant access control checks, wherein, the checks may be carried out by RCSE2 or RCSE1, then AE2 is provisioned with E2E credentials of AE1.

End-to-End Authentication Process

The E2E authentication process may be performed in a direct mode or via delegated mode. In the direct mode the two end entities that may be the source and sink of a message may perform an E2E authentication on their own. Resource constraints on either of the entities may require that certain public key operations are performed on a more resource rich entity. So, in the case of an actuator that controls the sprinkler system, the E2E authentication may be performed by an Entity such as the RCSE that the actuator is actually registered with instead of performing the authentication on the actuator (AE) itself. Therefore, the third-party credential requisition will have to be performed by the RCSE and not the AE. An attribute associated with the resource indicating that the messages may be authenticated using delegated mode or direct mode may be indicated at the RCSE.

Figure 23:
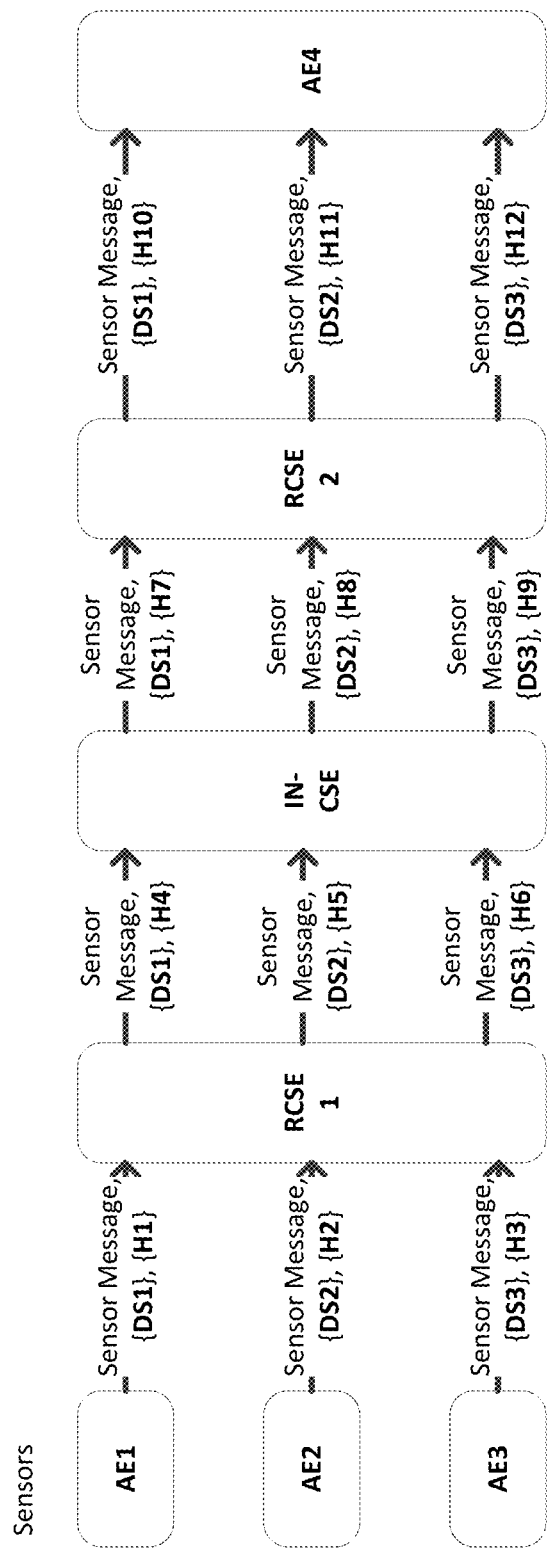
FIG. 23 illustrates an example of E2E authentication of sensor messages by an AE using a direct mode.

FIG. 23 illustrates a scenario wherein sensors AE1, AE2 and AE3 generate sensor messages at regular or irregular intervals and update their respective resources hosted by their RCSE1. These sensors may or may not perform similar operations and can be envisioned to be hosted by a different RCSEs. For simplicity it is depicted that all the AEs are registered to the same RCSE1. An AE4 that has subscribed to the "subscribed-to" resources of AE1, AE2 and AE3 may have been pre-provisioned with their respective E2E public key credentials during the subscription authorization procedure or TPCR phase or may have been explicitly provisioned.

AE1 sends a message indicating an operation (e.g., Request to Update the resource), the message has been digitally signed by AE1 using its private key. The appropriate meta-data and the security parameters must be used that are associated with that resource. For the sake of simplicity, DS here, represents digital signature used for E2E authentication, whereas, H1, H2 . . . represents either a digital signature or MAC associated with hop-by-hop security associations. The digital signature DS1 and optionally H1 which may be a MAC or DS associated with HbH credential associated between AE1 and RCSE1 may be sent as part of the (D)TLS message. H1 is optional since the RCSE may be able to use the DS1 to authenticate AE1 and therefore H1 may be redundant. However, if H1 is based on symmetric keys and the RCSE1 does not want to perform public key credential verification on its own, then H1 may be included as well. The RCSE1 forwards the message to IN-CSE and includes the meta-data, DS1 and H4, which may be the DS or MAC used for authenticating the RCSE1 by the IN-CSE and based on the HbH credentials associated with RCSE1 and IN-CSE. Similarly, IN-CSE forwards the message (including the original meta-data, DS1) and H7 to the RCSE2. The RCSE2 on authenticating the interim message originator IN-CSE, the RCSE2 sends a notification to AE4 including the message, meta-data, DS1 and H10. AE4 authenticates RCSE2 by verifying H10 and then begins to process the meta-data and uses the information obtained during the subscription process to determine the security parameters as well the algorithms, credentials, etc., that are to be used in authenticating AE1. AE4 uses AE1's public key to verify DS1 and if successful the content that may have been updated by AE1 is used by AE4, else the message is rejected. Similarly, AE4 authenticates messages from AE2 using AE2's public key to verify DS2 and verifies messages from AE3 using AE3's public key to verify DS3.

It may be possible for RCSE1, IN-CSE or any other intermediate entities that may be authorized to authenticate AE1 (DS1) before the message reaches RCSE2 or AE4. Since public key credentials are obtainable, any entity may be able to authenticate the messages provided that policies allow for such authentications to occur, in short intermediate entities may have to be authorized to perform such authentications. Therefore, if the RCSE1 or IN-CSE determines that the DS1 from AE1 has failed authentication, then the RCSE1/IN-CSE may discard the message based on policies governing the operations of RCSE1/IN-CSE. Alternatively, the message may be forwarded however, a flag that indicates that the message has failed may be added by RCSE1/IN-CSE to the message and then sent to RCSE2/AE4. The RCSE2 and or AE4 may not even process the DS since the flag indicates that the message failed authentication.

Figure 24:
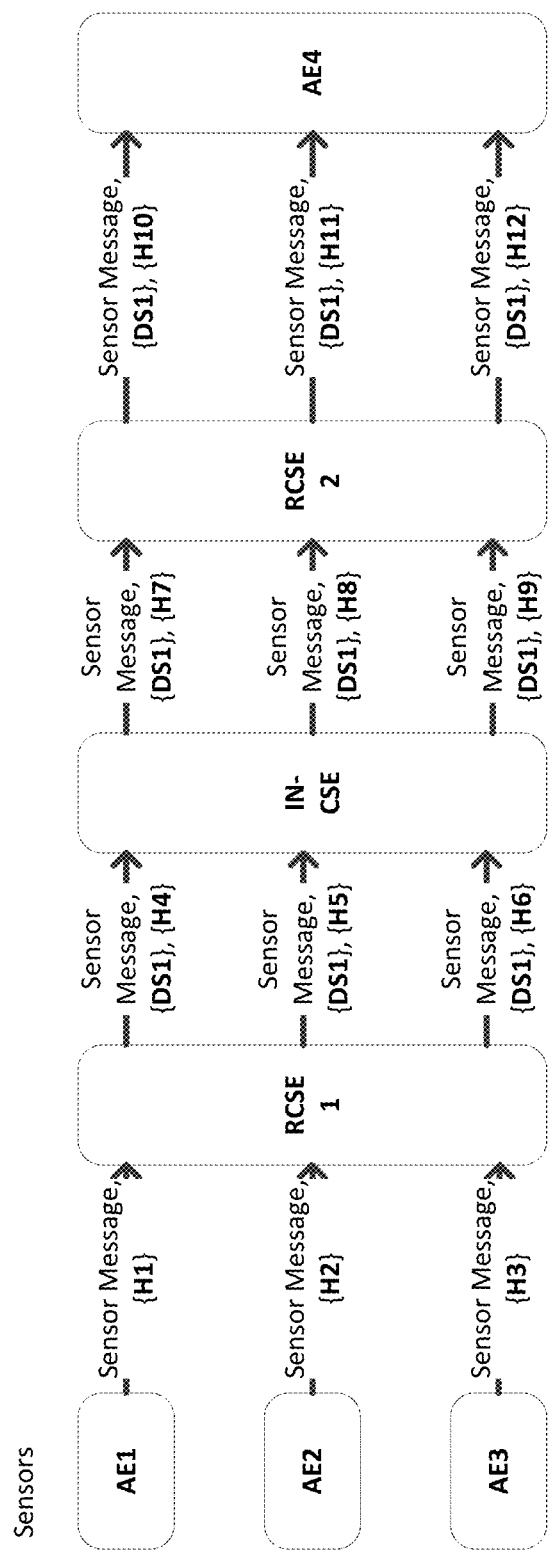
FIG. 24 illustrates an example of E2E authentication using a delegated mode.

FIG. 24 depicts a scenario wherein the RCSE1 acts on behalf of AE1, AE2 and AE3 as the entity that will be authenticated by AE4. The resources registered at RCSE1 for AE1, AE2 and AE3 may indicate that those resources are operating in delegated mode and that the information and security parameters associated with RCSE1 may be included during the credential distribution to third-party phase. Therefore any entity that would like to authenticate messages originating from AE1 must be aware that AE1 is operating in a delegated mode and the entity responsible for the authenticity of the messages originating from AE1 has been delegated or off-loaded to RCSE1. The authenticating entities (e.g., AE4) must therefore be provisioned with RCSE1's relevant public key credentials and security parameters.

AE1 sends a message to RCSE1 which may be protected using AE1 and RCSE1's shared security association, the message may include H1, which may be a MAC or DS associated between AE1 and RCSE1 for HbH security. Once, RCSE1 authenticates AE1 using H1, RCSE creates a digital signature of the message that may include meta-data from the original message from AE1 as well as meta-data of its message and uses its private key along with the appropriate security parameters and forwards the message to the IN-CSE. The IN-CSE follows similar process as described earlier and verifies H7 and forwards the message to AE4. AE4 based on the information obtained during the subscription process, realizes that the messages may have originated at AE1 but signed by RCSE1. AE4 may use the meta-data from AE1 and the public key of RCSE1 as well as the required security parameters to authenticate the message. It is may be possible that AE4 uses the meta-data from the message created by RCSE1 to authenticate AE1 as well or include the meta-data from both the AE1 as well as from RCSE1 in order to authenticate AE1 by proxy.

Figure 25:
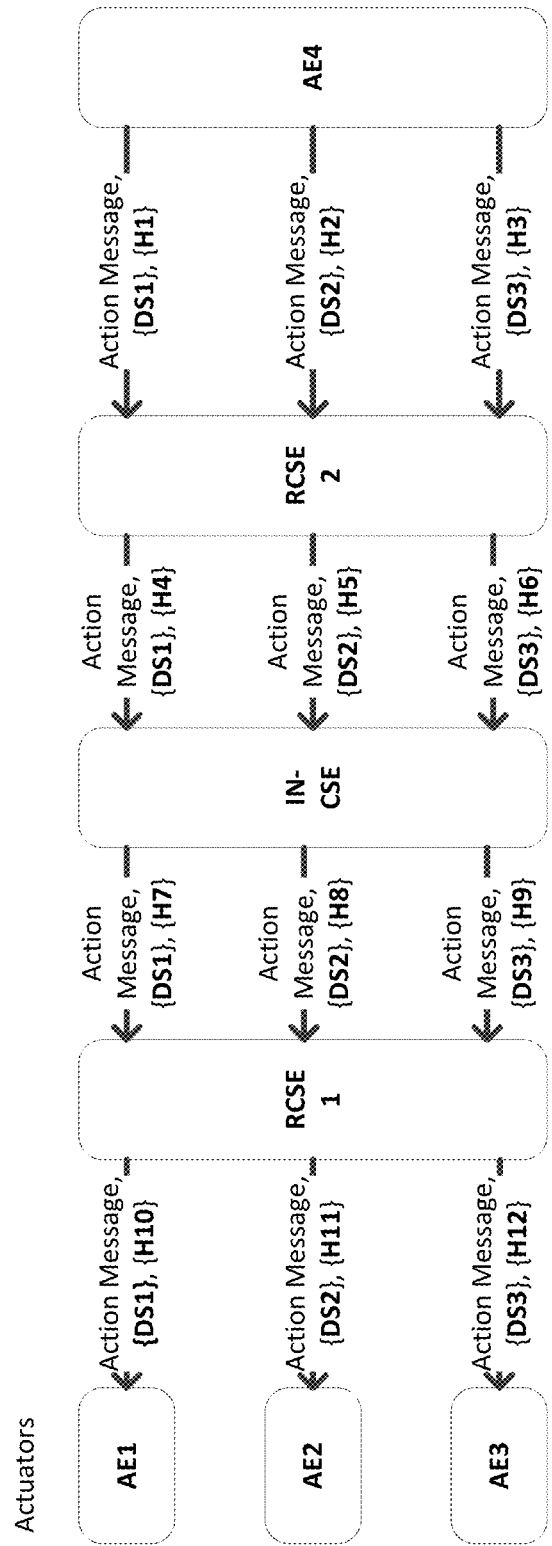
FIG. 25 illustrates an example of E2E authentication of a system or application by actuators in a direct mode.

FIG. 25 illustrates E2E authentication of a system or an application by the actuators using direct mode. It is assumed that the AEs are pre-provisioned with the application's (AE4) public key credentials. The Action message from the application may be for the actuators (e.g., sprinkler system) to start an action (e.g., spraying water or any other compound). The Action message may be a combination of an update message associated with a resource associated with the actuators or a notification of a change in the resource associated with the application. Irrespective of how the action is initiated the verification of whether the message to initiate the action actually originated from the system/application (AE4) may be authenticated.

AE4 creates a digital signature, (e.g DS1 used for message to AE1) of the message using its private key as well as the associated security parameters. The message is forwarded to the RCSE2 using a secure DTLS tunnel and may optionally include a MAC (H1), associated with HbH credentials. The RCSE2 authenticates the H1 (optional) and may instead authenticate the DS1 and forwards the message to IN-CSE. The IN-CSE authenticates RCSE2 by verifying H4 and forwards the message to RCSE1. The RCSE1 authenticates H7 and forwards the message to AE1. AE1 based on the policy and associated subscription information, it performs an E2E authentication of AE4, by using the meta-data of the message that may have been included based on context and security parameters as well as AE4's public key that may have been pre-provisioned during the subscription or TPCR. Similarly, AE2 and AE3 uses AE4's public key to verify their respective message which obviously have different signatures.

Figure 26:
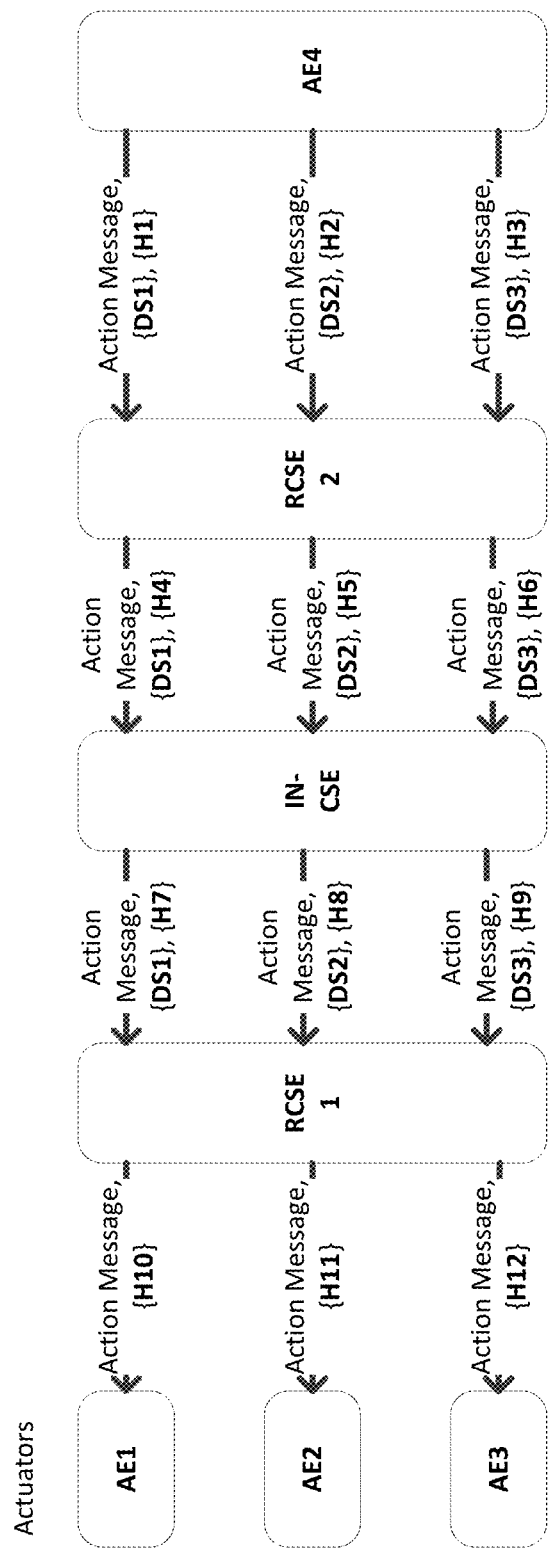
FIG. 26 illustrates an example of E2E authentication of a system or application by an RCSE on behalf of actuators.

FIG. 26 depicts a delegated mode of authentication, wherein the digital signatures are verified and authenticated by RCSE1 on behalf of AE1 as well as for AE2 and AE3. AE4's public key is used along with the security parameters in order for RCSE1 to verify DS1, DS2 and DS3 respectively.

EXAMPLE EMBODIMENTS

Figure 27:
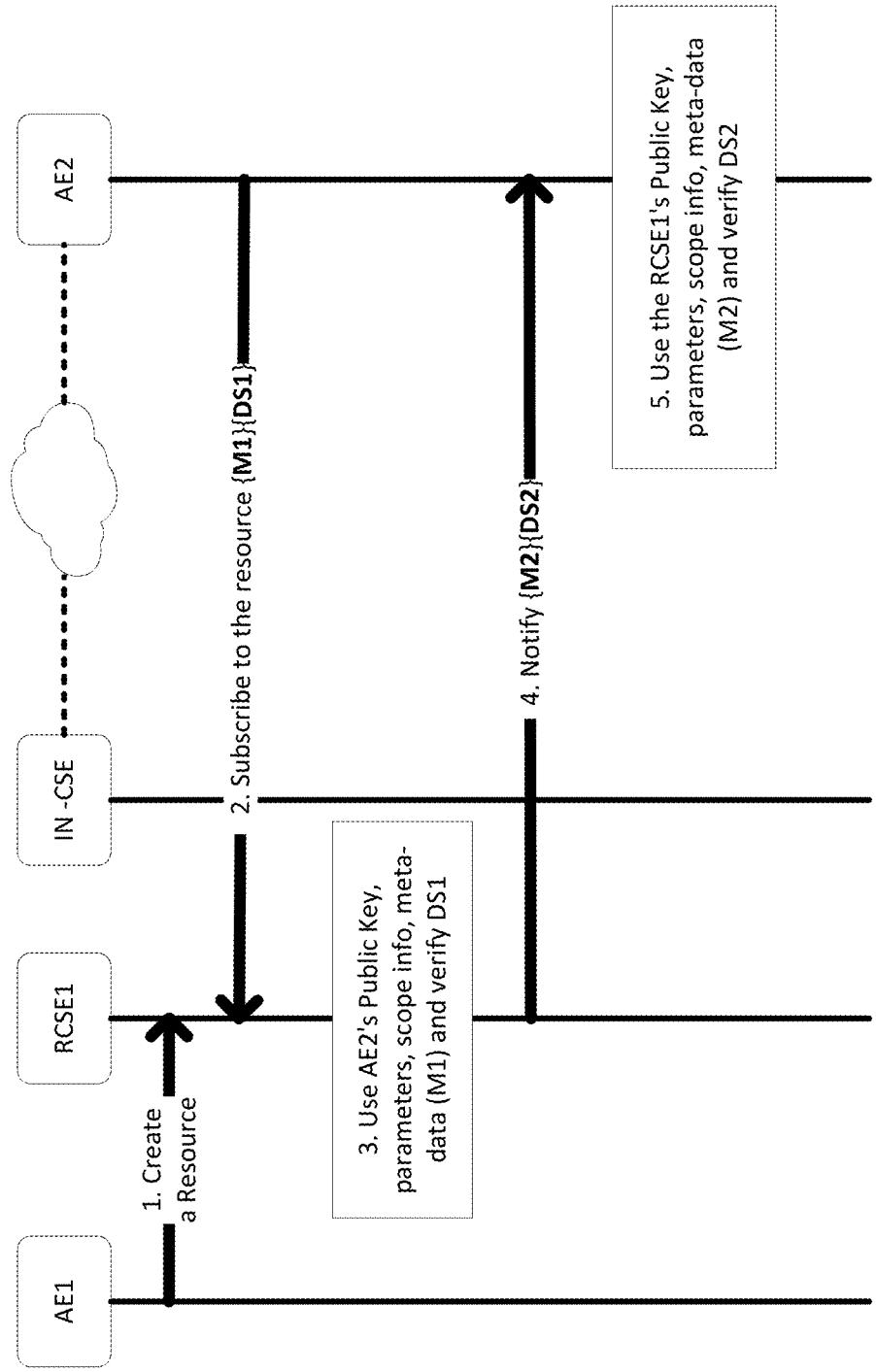
FIG. 27 illustrates an example of adding E2E digital signatures to oneM2M messages.

This section describes a detailed embodiment based on the oneM2M specification and the associated illustration is depicted in FIG. 27. It is assumed that by default that HbH security protection (e.g., (D)TLS) is used between two communicating entities. It may also be that the number of hops between an AE and another AE may be multiple and therefore may hop multiple trusted domains by means of multiple MN-CSE/IN-CSE. Messaging details of an embodiment wherein a delegated mode as well as non-delegated E2E modes:

In step 1, AE1 requests to create a resource at RCSE1. Based on the appropriate checks the RCSE1 registers and hosts the resource associated with RCSE1.

In step 2, an AE2 may request to subscribe to AE1 resource. Based on policies at RCSE1 or the service provider, AE2 may be required to be authenticated using its public key credentials. As part of the Request to subscribe message, AE2 includes a digital signature that is created by using its private key, meta-data and associated parameters based on the scope defined for E2E authentication.

The parameters or attributes that make up the Message Meta-data (M1) that is created and used by AE2 may include at the very least the following parameters:
  fr=AE2-ID;
  to=RCSE1-ID;
  res-id=resource-ID1;
  op="Subscription";

sessionid=RandomValue1 (optionally time-component as well).

Other parameters may also be included as part of the message meta-data. In some instances, where the intermediate hops do not modify the message, the message meta-data may be avoided altogether or only a sub-set of the parameters or header information may be included. In an Example DS creation process:

M1=(AE1-ID∥RCES1-ID∥resource-ID1∥"Subscription"∥RandomValue1);
Hash_Meta_Data (H1)=Hash_Algorithm (M1); and
DS1=Public_Key_Encryption_Algorithm (H1, AE1-PrivateKey).

Alternatively, the entire message may be integrity protected and used for creation of the DS.

In step 3, based on policies at RCSE1, it realizes that E2E authentication of "subscription' messages will have to be performed. RCSE1 processes the Meta-data and obtains AE2's public key if it has not been already provisioned with it, then based on the scope associated with the credential, RCSE1 processes the DS1 in the following manner:

Decrypted_H1 (D-H1)=Public_Key_Encryption_Algorithm (DS, AE1-PublicKey); and
Computed_Hash_Meta_Data (C-H1)=Hash_Algorithm (M1).

If D-H1==C-H1, then the message originator and message is authenticated.

In step, 4 RCSE1 creates a "notification" message and includes the appropriate message meta-data (M2) and the associated digital signature (DS2) and forwards the message destined to AE2. Using mechanisms described earlier, the M2 may be created and DS2 may be computed as follows:

fr=RCSE1-ID;
to=AE2-ID;
res-id=resource-ID1;
op="Notification";
sessionid=RandomValue2;
M2=(RCES1-ID∥AE1-ID∥resource-ID1∥"Notification"∥RandomValue2);
Hash_Meta_Data (H2)=Hash_Algorithm (M2); and
DS2=Public_Key_Encryption_Algorithm (H2, RCSE1-PrivateKey).

In step 5, Using similar mechanisms described earlier, AE2 verifies DS2 using the message meta-data (M2), RCSE1's public key and based on the scope info. If AE2 is not able to verify DS2 and therefore not able to authenticate RCSE1, then the "Notify" message may be discarded.

Figure 28:
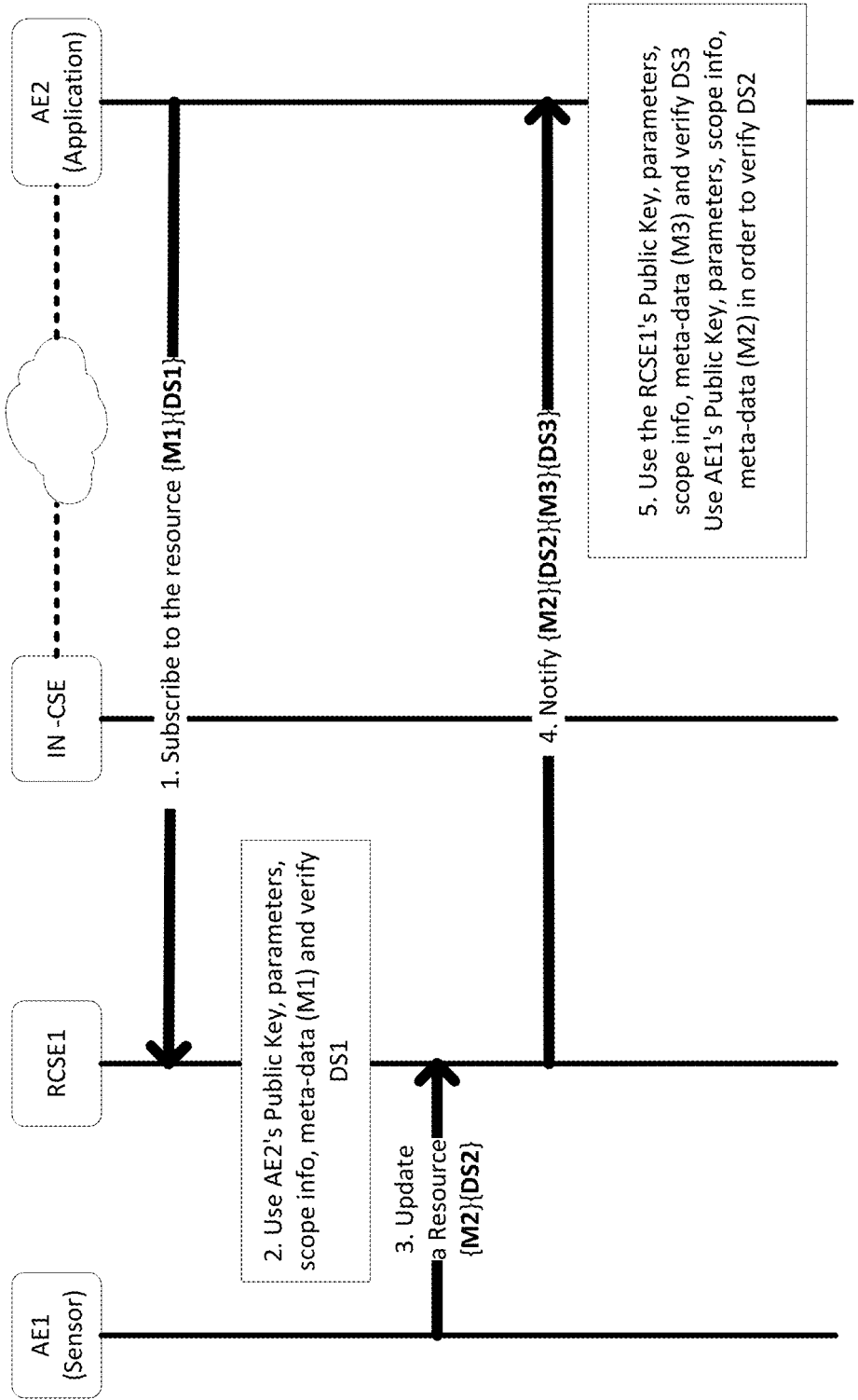
FIG. 28 illustrates an example of multiple E2E authentication.

Another embodiment, wherein, both the end entities are able to authenticate messages that originate from one another in a truly E2E manner is depicted in FIG. 28. Similar to the call flow depicted in FIG. 27, here, however, AE2 would like to authenticate the original message from AE1 that may have triggered the notification message from the RCSE1.

In step 1 of FIG. 28, AE2 subscribes to a resources hosted at RCSE1. AE2 provides a message meta-data (M1) as well as an associated DS1, computed using AE2's private key, M1 and based on the scope defined for usage of cryptographic operations.

In step 2, RCSE1 verifies DS1 sent by AE2, by using AE2's public key along with M1 and based on the scope that was defined.

In step 3, AE1 may perform an update operation to a resource hosted on RCSE1. The messaging to perform the update operation may be authenticated by creating a digital signature based on the message meta-data (M2) and signing it with AE1's private key. AE1 may use the following procedure in order to create the DS:

fr=AE1-ID;
to=RCSE1-ID;
res-id=resource-ID1;
op="Update";
sessionid=RandomValue2;
M2=(AE1-ID∥RCSE1-ID∥resource-ID1∥"Update"∥RandomValue2);
Hash_Meta_Data (H2)=Hash_Algorithm (M2);
DS2=Public_Key_Encryption_Algorithm (H2, AE1-PrivateKey); and
AE1 sends the Update message along with M2 and corresponding DS2 to RCSE1.

In step 4, RCSE1 may optionally authenticate the message using AE1's public key along with the M2 and based on the scope parameters. If the message cannot be authenticated then the Update message may be discarded. If the DS is verified, then RCSE1 may optionally create a message meta-data (M3) for the Notification message that it creates and digitally sign it using RCSE1's private key and creates a DS3. The RCSE1 may optionally send both the M2/DS2 as well as M3/DS3 as part of the notification message.

In step 5, AE2 uses RCSE1's public key in order to authenticate and verify DS3, thereby authenticating the Notification message and may use AE1's public key in order to verify DS2 and thereby authenticating that the initial Update message was indeed sent by AE1.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 2:
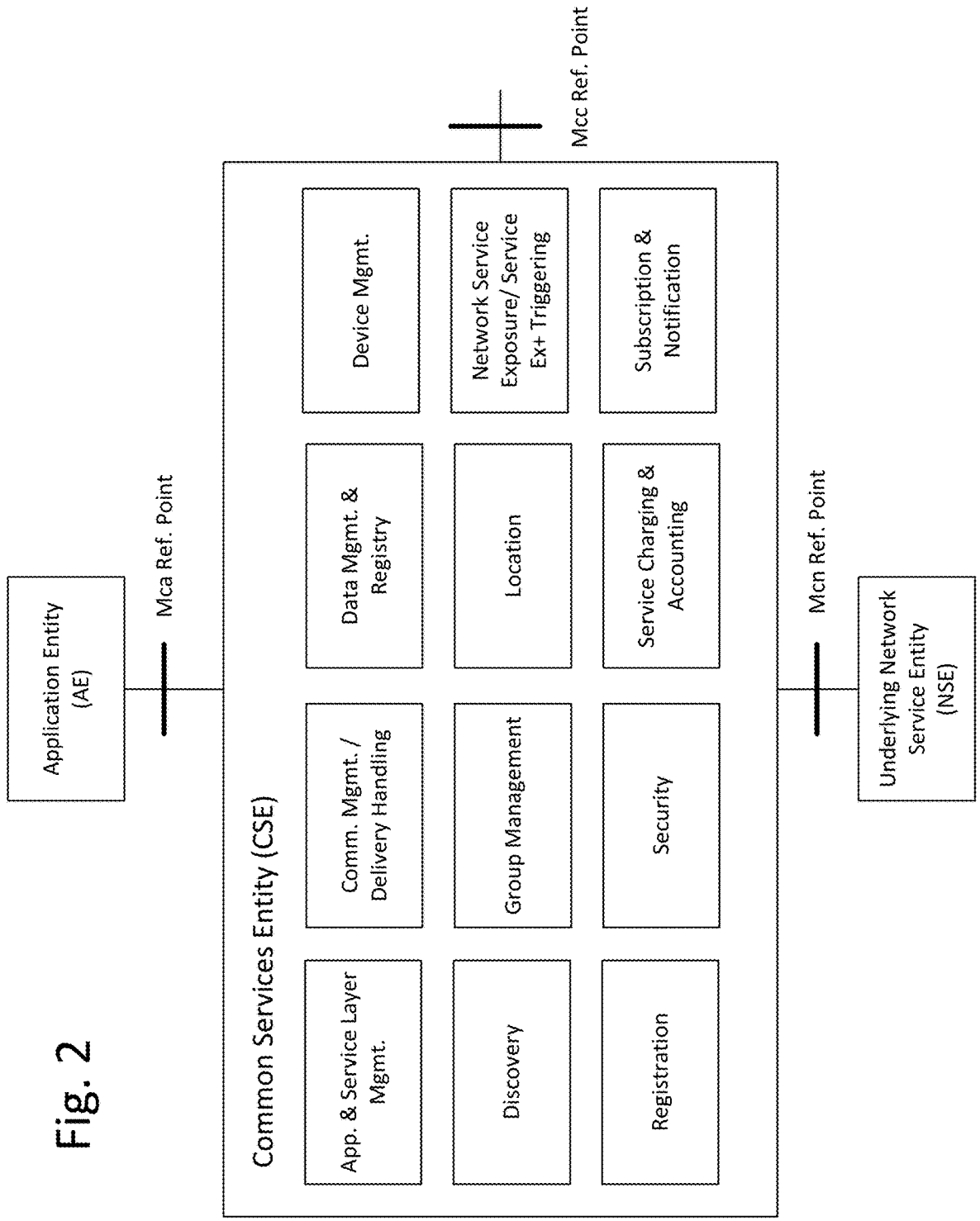
FIG. 2 illustrates an example Common Services Function/Common Services Entity (CSE.)
Figure 29:
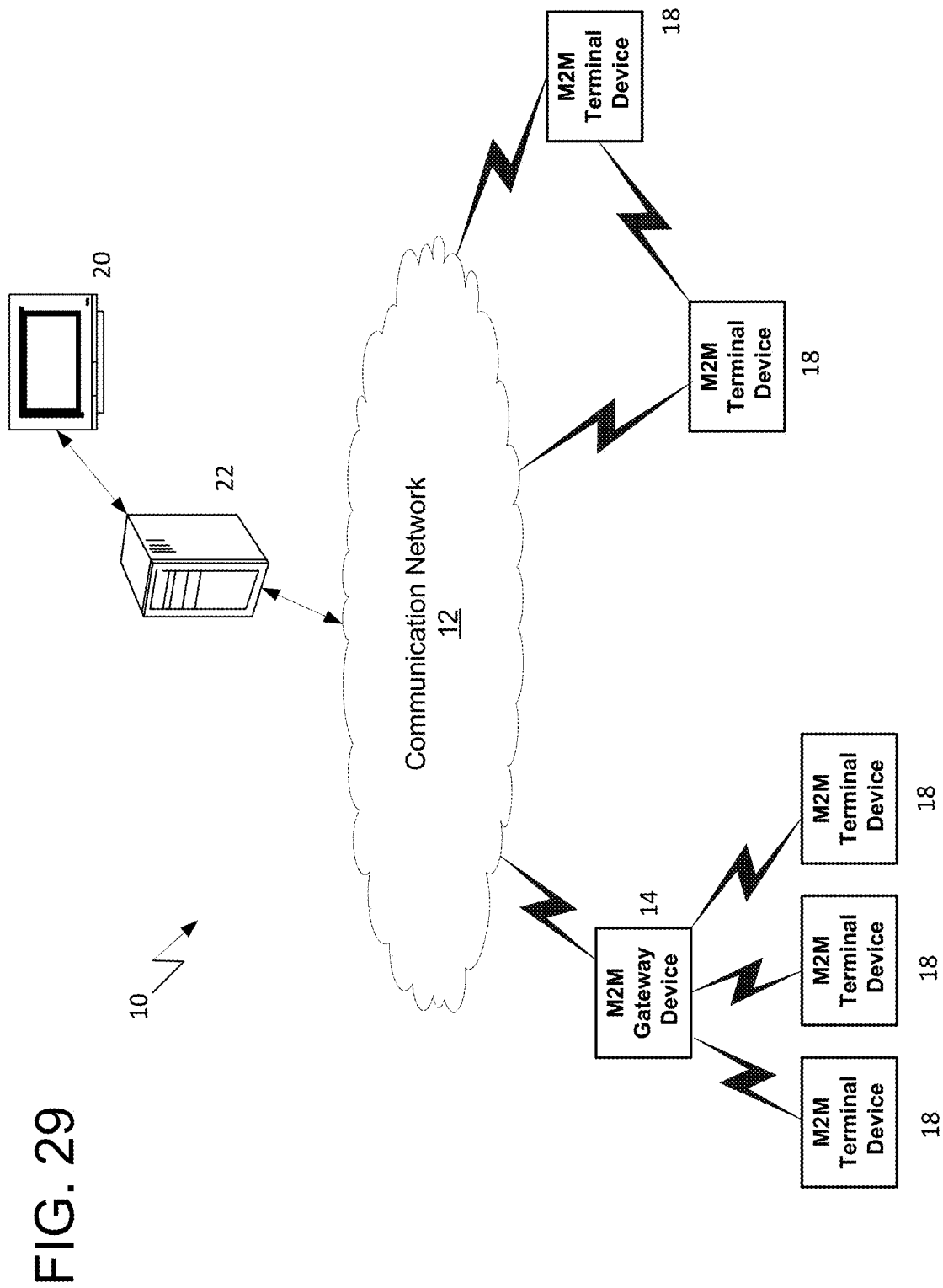
FIG. 29 is a system diagram of an example machine-to-machine (M2M), Internet of Things (IoT), or Web of Things (WoT) communication system in which one or more disclosed embodiments may be implemented.

FIG. 29 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Any of the client, proxy, or server devices illustrated in any of FIGS. 3-9, 11-13, 15, 16, 18, 19 and 21-28 may comprise a node of a communication system such as the ones illustrated in FIGS. 2, 4, and 14.

As shown in FIG. 29, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 29, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 30:
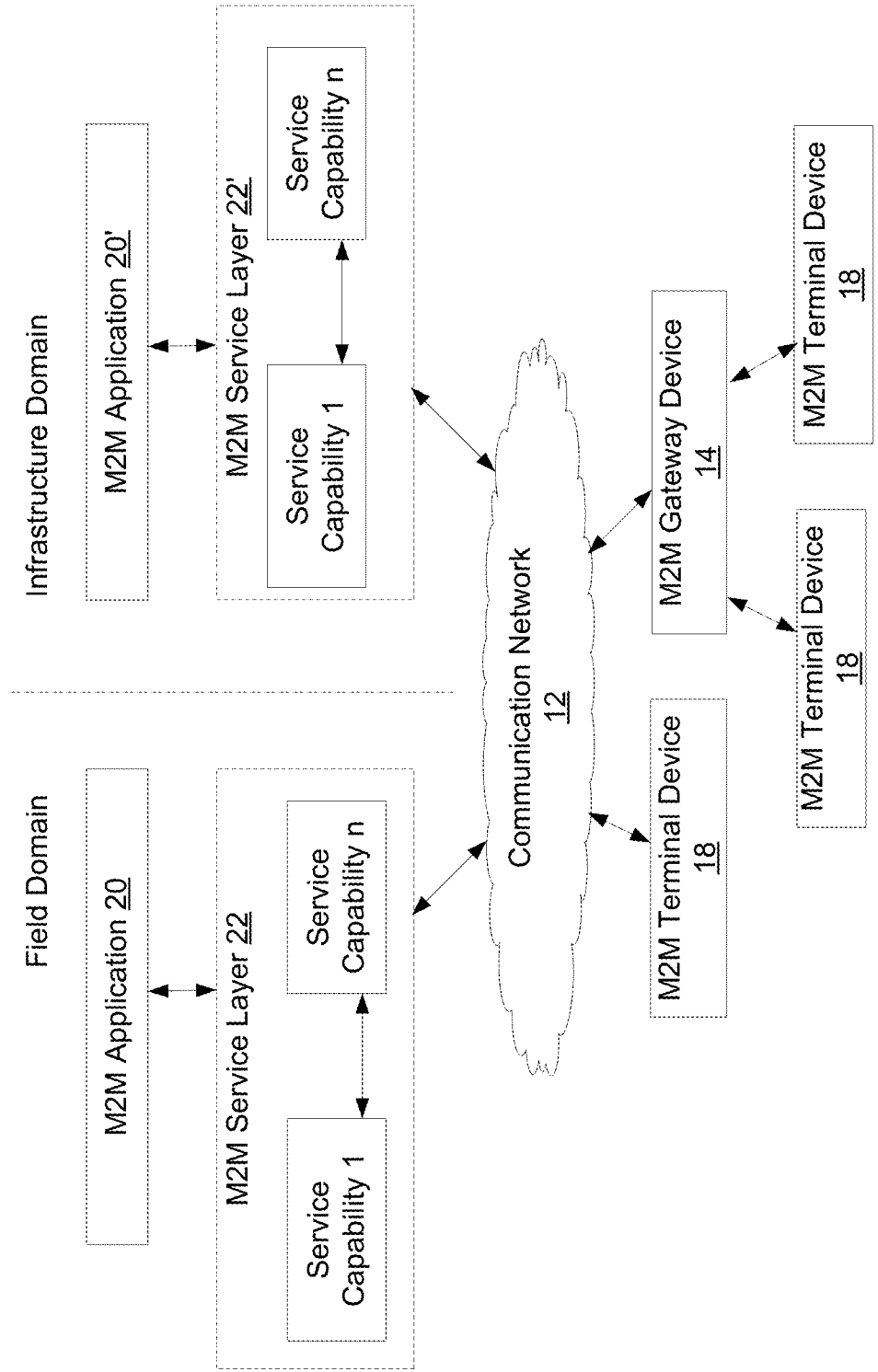
FIG. 30 is a system diagram of an example architecture that may be used within the M2M/IoT/WoT communications system illustrated in FIG. 29.

Referring to FIG. 30, the illustrated M2M service layer 22 in the field domain provides services for the M2M application 20, M2M gateways 14, and M2M devices 18 and the communication network 12. It will be understood that the M2M service layer 22 may communicate with any number of M2M applications, M2M gateways 14, M2M devices 18, and communication networks 12 as desired. The M2M service layer 22 may be implemented by one or more nodes of the network, which may comprise server, computers, devices, or the like. The M2M service layer 22 provides service capabilities that apply to M2M devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M devices 18 in the field domain. It will be understood that the M2M service layer 22' may communicate with any number of M2M applications, M2M gateways and M2M devices. The M2M service layer 22' may interact with a service layer by a different service provider. The M2M service layer 22' may be implemented by one or more nodes of the network, which may comprise servers, computers, devices, virtual machines (e.g., cloud computing/storage farms, etc.) or the like.

Referring also to FIG. 30, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a service layer, such as the service layers 22 and 22' illustrated in FIGS. 29 and 30, defines a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g., infrastructure node, middle node, application-specific node). The Third Generation Partnership Project (3GPP) has also defined an architecture for machine-type communications (MTC). In that architecture the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 31 or FIG. 32 described below.

Further, the methods and functionalities described herein may be implemented as part of an M2M network that uses a Service Oriented Architecture (SOA) and/or a Resource-Oriented Architecture (ROA) to access services.

Figure 31:
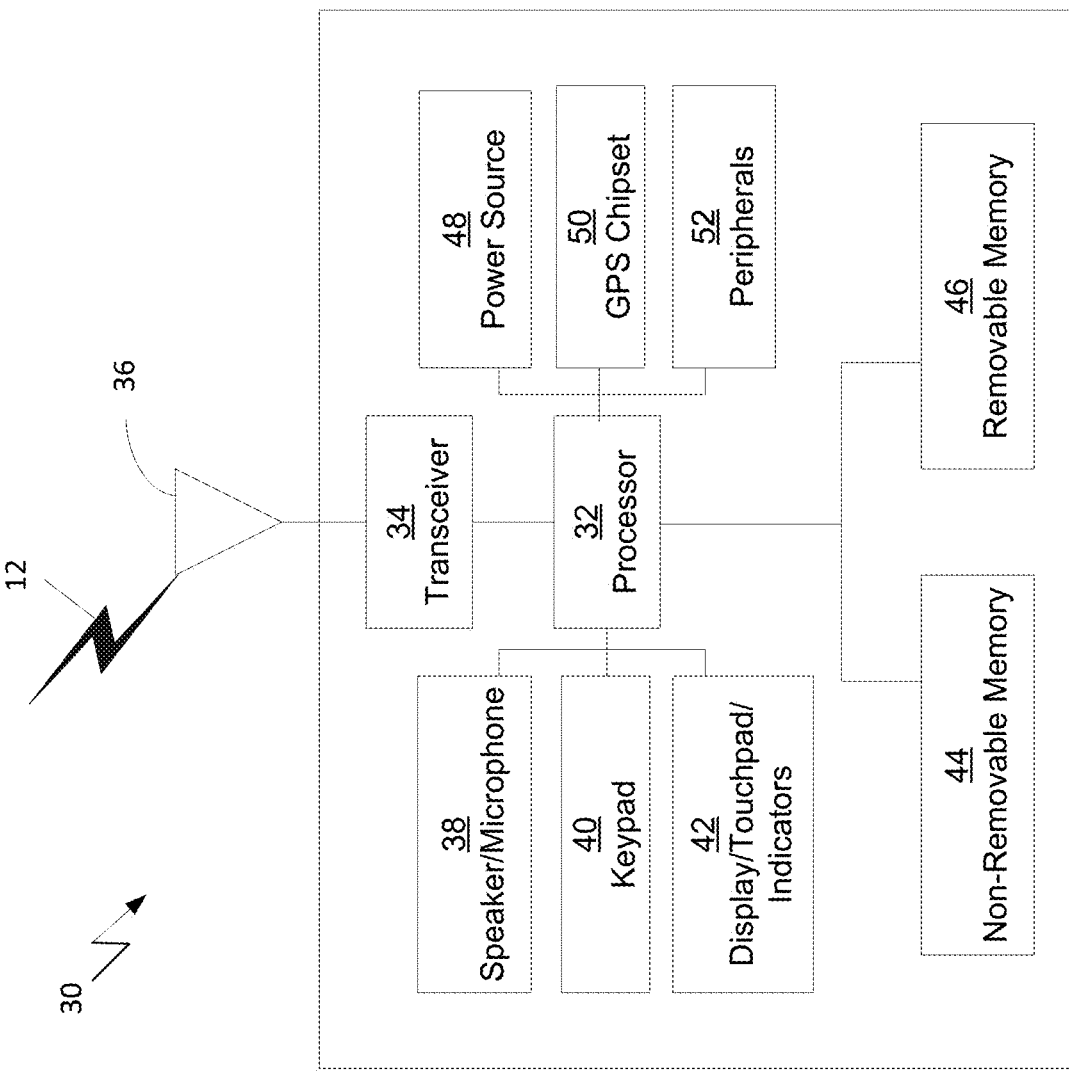
FIG. 31 is a system diagram of an example communication network node, such as an M2M/IoT/WoT device, gateway, or server that may be used within the communications system illustrated in FIGS. 29 and 30.

FIG. 31 is a block diagram of an example hardware/software architecture of a node of a network, such as one of the clients, servers, or proxies illustrated in FIGS. 3-9, 11-13, 15, 16, 18, 19 and 21-28 which may operate as an M2M server, gateway, device, or other node in an M2M network such as that illustrated in FIGS. 29 and 30. As shown in FIG. 31, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements aspects of the end-to end authentication functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 31, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 3-9, 11-13, 15, 16, 18, 19 and 21-28) and in the claims. While FIG. 31 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 31 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 32:
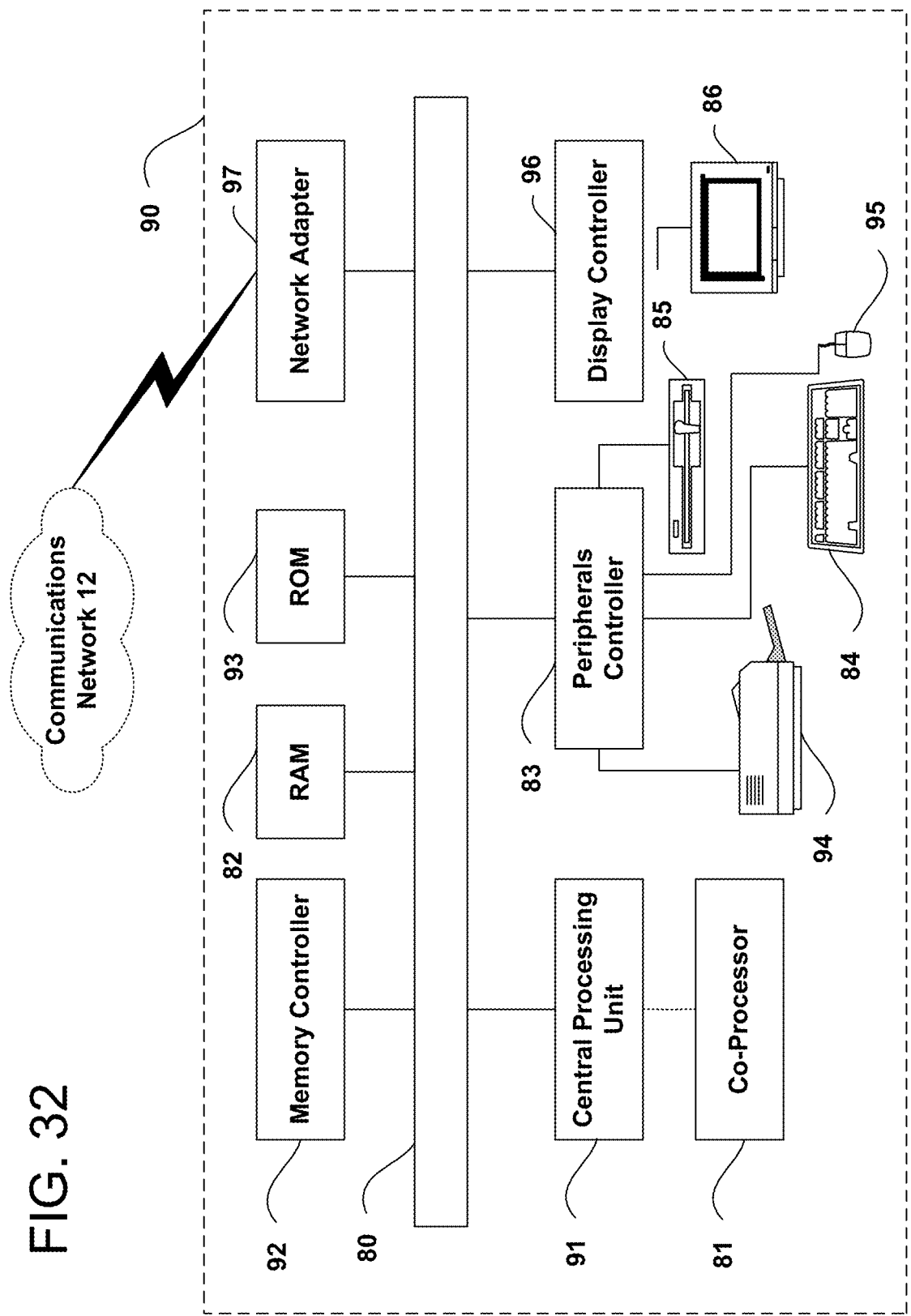
FIG. 32 is a block diagram of an example computing system in which a node of the communication system of FIGS. 29 and 30 may be embodied.

FIG. 32 is a block diagram of an exemplary computing system 90 which may also be used to implement one or more nodes of a network, such as the clients, servers, or proxies illustrated in FIGS. 3-9, 11-13, 15, 16, 18, 19 and 21-28, which may operate as an M2M server, gateway, device, or other node in an M2M network such as that illustrated in FIGS. 29 and 30. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 29 and FIG. 30, to enable the computing system 90 to communicate with other nodes of the network. The communication circuitry, alone or in combination with the CPU 91, may be used to perform the transmitting and receiving steps described herein, e.g., in FIGS. 3-9, 11-13, 15, 16, 18, 19 and 21-28, and in the claims.

FIGS. 3-9, 11-13, 15, 16, 18, 19 and 21-28, the descriptions thereof, and the claims herein illustrate various embodiments of methods and apparatus for enabling end-to end authentication functionality. In these figures, various steps or operations are shown being performed by one or more clients, servers, and/or proxies. It is understood that the clients, servers, and proxies illustrated in these figures may represent logical entities in a communication network and may be implemented in the form of software, i.e., computer-executable instructions, stored in a memory of, and executing on a processor of, a node of such network, which may comprise one of the general architectures illustrated in FIG. 29 or 30 as described herein. That is, the methods illustrated in FIGS. 3-9, 11-13, 15, 16, 18, 19 and 21-28 and the claims may be implemented in the form of software, i.e., computer-executable instructions stored in a memory of a network node, such as for example the node or computer system illustrated in FIG. 31 or 32, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 31 and 32 respectively) of the node under control of the processor of the node and the computer-executable instructions (e.g., software) that it executes.

It is understood that any or all of the systems, methods and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile media, and removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

We claim:

1. An apparatus comprising a processor, a memory, and communication circuitry, the apparatus being connected to a communications network via its communication circuitry, the apparatus further comprising computer-executable instructions stored in the memory of the apparatus which, when executed by the processor of the apparatus, cause the apparatus to:
   receive, from a message originator, a message, the message being intended for a recipient and comprising an authentication tag, wherein the originator and the recipient are separate from the apparatus;
   send, to a credential registry, a request, the request comprising an identifier of the originator;
   receive, from the credential registry, a response, the response comprising a public key credential of the originator, the response further comprising an indication of types of messages that are to be authenticated by the apparatus using the public key credential of the originator;
   if, in accordance with the response, the message is of a type that is to be authenticated by the apparatus, verify the authentication tag using the public key credential of the originator; and
   responsive to the authentication tag being verified, send, to the recipient, the message and a flag, the flag signifying authentication of the message on behalf of the recipient.

2. The apparatus of claim 1, wherein the response further comprises one or more security parameters selected from a list comprising hop-by-hop signing encryption, end-to-end encryption, and end-to-end signing, and wherein the apparatus utilizes the one or more parameters to authenticate the message.

3. The apparatus of claim 1, wherein the computer-executable instructions further cause the apparatus to receive, from the credential registry, an advertisement of credential registry services.

4. The apparatus of claim 1, wherein the computer-executable instructions further cause the apparatus to conduct mutual authentication with the credential registry.

5. The apparatus of claim 1, wherein the public key credential of the originator comprises a certificate.

* * * * *